(12) United States Patent
Saito et al.

(10) Patent No.: US 10,200,663 B2
(45) Date of Patent: Feb. 5, 2019

(54) IMAGE PROCESSING DEVICE, IMAGING DEVICE, IMAGE PROCESSING METHOD, AND PROGRAM

(71) Applicant: FUJIFILM Corporation, Tokyo (JP)

(72) Inventors: Taro Saito, Saitama (JP); Shinya Fujiwara, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/372,522

(22) Filed: Dec. 8, 2016

(65) Prior Publication Data

US 2017/0094240 A1    Mar. 30, 2017

Related U.S. Application Data

(63) Continuation of application No. PCT/JP2015/062696, filed on Apr. 27, 2015.

(30) Foreign Application Priority Data

Jul. 8, 2014  (JP) ................ 2014-140430

(51) Int. Cl.
*H04N 9/73* (2006.01)
*H04N 5/225* (2006.01)
(Continued)

(52) U.S. Cl.
CPC .............. *H04N 9/73* (2013.01); *G06T 1/20* (2013.01); *G06T 5/008* (2013.01); *G06T 5/50* (2013.01);
(Continued)

(58) Field of Classification Search
CPC ...... H04N 9/73; H04N 5/2256; H04N 5/2351; H04N 5/243; H04N 9/07; H04N 9/735;
(Continued)

(56) References Cited

U.S. PATENT DOCUMENTS

2007/0154203 A1* 7/2007 Takahashi ............ H04N 5/2351
396/213
2010/0194919 A1* 8/2010 Ishii ..................... H04N 5/2354
348/224.1
(Continued)

FOREIGN PATENT DOCUMENTS

JP   2003-296720 A   10/2003
JP   2010-193002 A    9/2010
(Continued)

OTHER PUBLICATIONS

International Search Report (PCT/ISA/210) issued in PCT/JP2015/062696, dated Jul. 7, 2015.
(Continued)

*Primary Examiner* — Nhan T Tran
(74) *Attorney, Agent, or Firm* — Birch, Stewart, Kolasch & Birch, LLP

(57) ABSTRACT

A flash image component acquisition unit (40) of an image processing device (31) acquires the flash image component data on the basis of first image data which is acquired by capturing an image of the object while flash light is emitted. A flash correction data acquisition unit (42) acquires flash correction data in which the difference in the luminosity of the flash image component data caused by the color of the object has been reflected. The flash luminosity correction unit (44) acquires flash image correction component data, in which the difference in the luminosity of the flash image component data caused by the color of the object has been compensated for, on the basis of the flash image component data and the flash correction data.

29 Claims, 22 Drawing Sheets

(51) Int. Cl.
*H04N 5/235* (2006.01)
*G06T 7/90* (2017.01)
*H04N 1/46* (2006.01)
*H04N 1/60* (2006.01)
*H04N 9/07* (2006.01)
*H04N 5/243* (2006.01)
*G06T 1/20* (2006.01)
*G06T 5/00* (2006.01)
*G06T 5/50* (2006.01)

(52) U.S. Cl.
CPC ................. *G06T 7/90* (2017.01); *H04N 1/46* (2013.01); *H04N 1/60* (2013.01); *H04N 1/6027* (2013.01); *H04N 5/2256* (2013.01); *H04N 5/2351* (2013.01); *H04N 5/2354* (2013.01); *H04N 5/243* (2013.01); *H04N 9/07* (2013.01); *H04N 9/735* (2013.01); *G06T 2207/10024* (2013.01); *G06T 2207/10152* (2013.01); *G06T 2207/20021* (2013.01)

(58) Field of Classification Search
CPC ...... H04N 5/2354; H04N 1/6027; H04N 1/60; H04N 1/46; G06T 7/408; G06T 2207/10024; G06T 2207/20021; G06T 5/50; G06T 5/008; G06T 1/20; G06T 7/90; G06T 2207/10152
See application file for complete search history.

(56) References Cited

U.S. PATENT DOCUMENTS

| | | | | |
|---|---|---|---|---|
| 2011/0157413 | A1* | 6/2011 | Yoshida | H04N 5/2256 348/223.1 |
| 2012/0008008 | A1* | 1/2012 | Nakabayashi | H04N 5/2355 348/223.1 |
| 2012/0113295 | A1* | 5/2012 | Kitagawa | H04N 5/2351 348/224.1 |
| 2014/0036106 | A1* | 2/2014 | Ouchi | H04N 9/73 348/224.1 |
| 2014/0063287 | A1* | 3/2014 | Yamada | H04N 5/2351 348/229.1 |

FOREIGN PATENT DOCUMENTS

| | | |
|---|---|---|
| JP | 2012-019293 A | 1/2012 |
| JP | 2012-100170 A | 5/2012 |
| WO | WO 2009/139154 A1 | 11/2009 |

OTHER PUBLICATIONS

Written Opinion (PCT/ISA/237) issued in PCT/JP2015/062696, dated Jul. 7, 2015.
English Translation of International Preliminary Report on Patentability (including PCT/IB/373 and PCT/ISA/237) for PCT/JP2015/062696, dated Jan. 10, 2017.
Office Action dated Aug. 17, 2018 in counterpart Chinese Patent Application No. 201580036937.7, with English translation.

* cited by examiner

FIG. 10
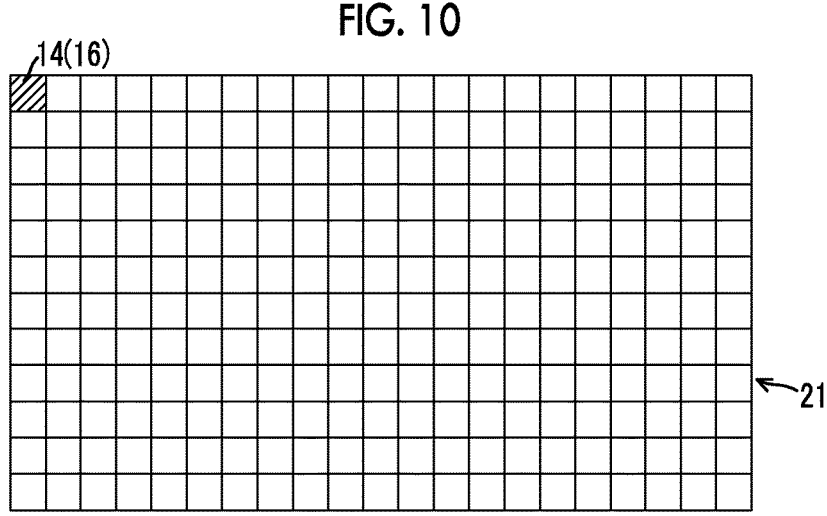
FIG. 11A
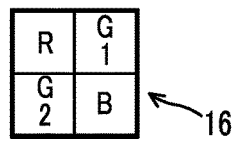
FIG. 11B
FIG. 12
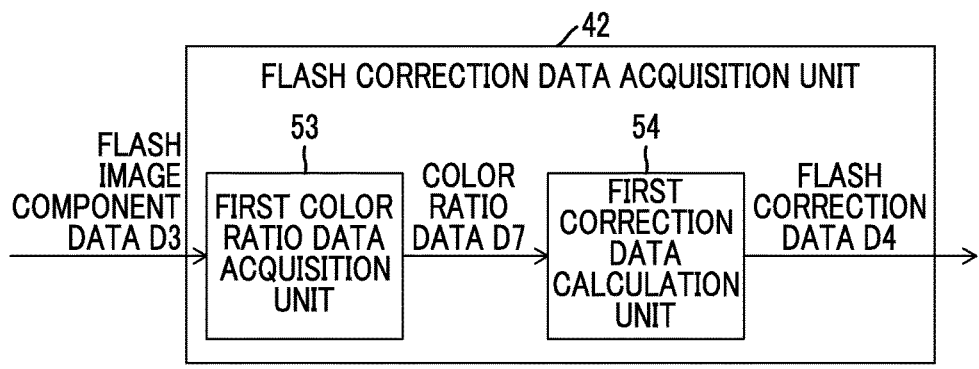

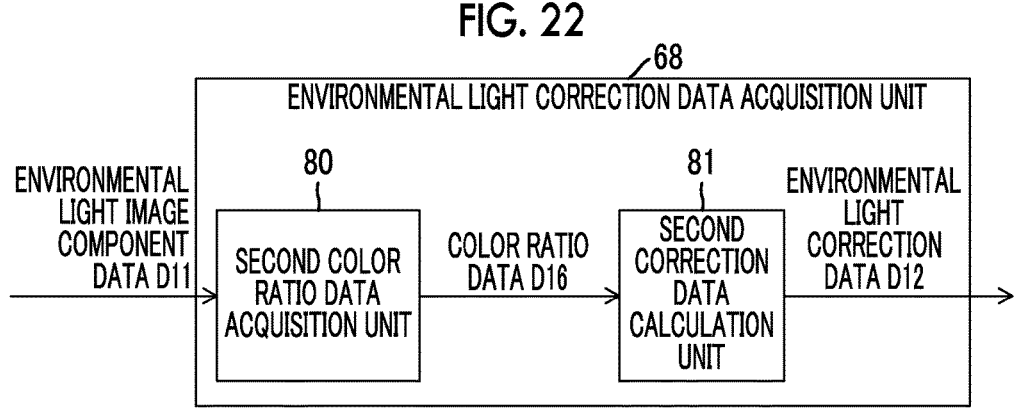
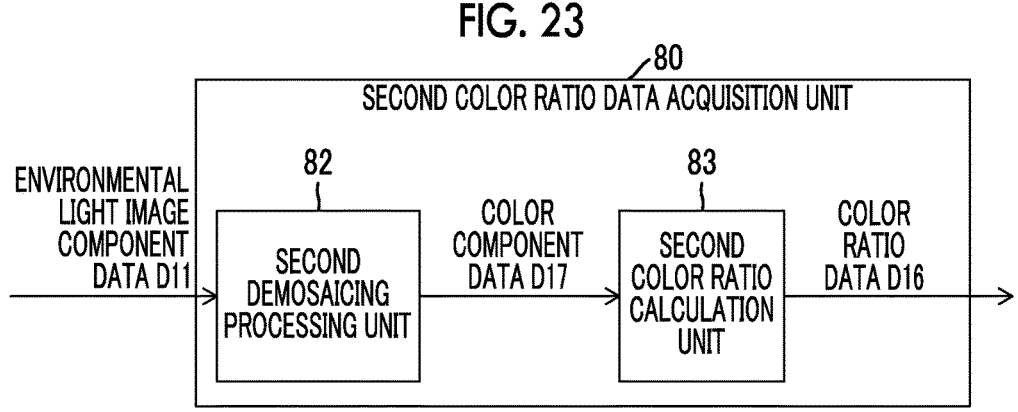
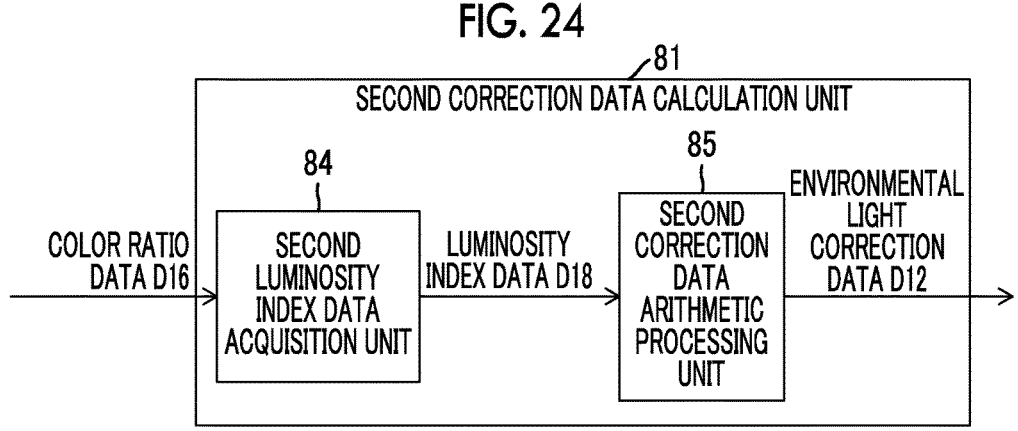

IMAGE PROCESSING DEVICE, IMAGING DEVICE, IMAGE PROCESSING METHOD, AND PROGRAM

CROSS-REFERENCE TO RELATED APPLICATIONS

This application is a Continuation of PCT International Application No. PCT/JP2015/062696 filed on Apr. 27, 2015, which claims priority under 35 U.S.C. § 119(a) to Japanese Patent Application No. 2014-140430 filed on Jul. 8, 2014. Each of the above applications is hereby expressly incorporated by reference, in their entirety, into the present application.

BACKGROUND OF THE INVENTION

1. Field of the Invention

The present invention relates to an image processing device, an imaging device, an image processing method, and a program, and more particularly, to image processing for image data which is captured and acquired while flash light is emitted.

2. Description of the Related Art

An image (hereinafter, also referred to as a "flash non-emission image") which is acquired by an imaging operation without emitting flash light (hereinafter, also referred to as a "flash non-emission imaging" operation) is basically affected by only environmental light. In contrast, an image (hereinafter, also referred to as a "flash emission image") which is acquired by an imaging operation performed while flash light is emitted (hereinafter, also referred to as a "flash emission imaging" operation) is affected by flash light in addition to environmental light.

In the flash emission image, a "portion such as a main object that is greatly affected by flash light" and a "a portion such as the background that is slightly affected or is not substantially affected by flash light" are mixed. That is, for example, in a flash emission image, an image of the main object in the vicinity of a flash light emitting unit is affected by flash light, in addition to environmental light. In contrast, for example, an image of the background that is far away from the flash light emitting unit is mainly affected by environmental light in the flash emission image. As such, in one flash emission image, there are a plurality of image portions affected by light sources of substantially different types. Therefore, in a case in which the white balance of the entire flash emission image is collectively adjusted, it is difficult to optimize the white balance of a plurality of image portions affected by light sources of substantially different types at the same time.

For this reason, in white balance processing for a flash emission image, an image portion, such as the background, and an image portion, such as the main object, are regarded as different light source regions and white balance processing is separately performed for the image portions to improve the color of an image.

For example, JP2012-19293A discloses an image processing device which calculates a white balance map from captured image data and monitor image data. The white balance map is data for appropriately adjusting the white balance of each of a pixel region which is irradiated with strobe light (flash) and is bright and a pixel portion which is not irradiated with strobe light and is dark in captured image data.

In addition, JP2010-193002A discloses an imaging device which performs image processing in order to achieve stable white balance correction in white balance processing for an image acquired by a strobe (flash) emission imaging operation. The imaging device calculates a white balance correction value from strobe emission image data, strobe non-emission image data, and previous image data captured without emitting strobe light.

SUMMARY OF THE INVENTION

As described above, for example, a method is considered which separates an "image portion that is affected by flash light" from an "image portion that is not affected by flash light", on the basis of a plurality of captured images of the same object in which image portions of a main object have different brightnesses, using data of a flash emission image and data of a flash non-emission image.

However, even if an object is uniformly irradiated with flash light during a flash emission imaging operation, the luminosity of the actually captured image varies depending on the color of the object. Therefore, it is difficult to accurately estimate the influence of flash light on the luminosity of the flash emission image only from difference data between the data of the flash emission image and the data of the flash non-emission image.

For example, a flash emission imaging operation and a flash non-emission imaging operation were performed for a red color chart, a green color chart, and a blue color chart as objects which were attached to a flat plate. In these imaging operations, a digital camera (imaging device) provided with an imaging element having red, green, and blue (R, G, and B) color filters was used and the red color chart, the green color chart, and the blue color chart were disposed at positions that were substantially equidistant from the digital camera. Then, the relationship between the brightnesses (brightness values) of flash light image components in the color charts was calculated on the basis of a brightness value calculated from difference data between a flash emission image and a flash non-emission image. Here, a "brightness value (Y)" was calculated by calculating the difference data between the flash emission image and the flash non-emission image on the basis of RGB data (R, G, and B pixel values) and applying the RGB data of the difference data to an expression represented by "Y=0.3*R+0.6*G+0.1*B". The results illustrated in FIG. 32 were obtained.

FIG. 32 is a graph illustrating the relationship between the brightnesses of the "difference data between the flash emission image and the flash non-emission image" in the red color chart, the green color chart, and the blue color chart. In FIG. 32, the vertical axis indicates the magnitude of the brightness value (Y) of the "difference data between the flash emission image and the flash non-emission image" in each color chart.

In a case in which it is assumed that the brightness of a captured and acquired image does not depend on the color of the object, it is considered that the brightness values (Y) of the "difference data between the flash emission image and the flash non-emission image" in the red color chart, the green color chart, and the blue color chart attached to the flat plate are equal to each other. However, as can be seen from FIG. 32, in practice, the brightness values of the "difference data between the flash emission image and the flash non-emission image" in the red color chart, the green color chart, and the blue color chart are different from each other and the brightness of the flash emission image depends on the color of the object.

Therefore, both the influence of flash light and the influence of the color of the object are reflected in the difference data between the flash emission image and the flash non-emission image. "Data indicating the influence of flash light in a flash emission image" is not necessarily accurately obtained from "data from which the influence of the color of the object has not been removed". Therefore, it is preferable to compensate for a difference in luminosity caused by the color of the object in image data to be processed, in order to accurately perform various types of image processing such as white balance processing.

The related art does not disclose a method which pays attention to a difference in luminosity caused by the color of an object and performs various types of image processing such as white balance processing. For example, the image processing device disclosed in JP2012-19293A divides captured image data into a bright pixel region and a dark pixel region and performs white balance processing. However, no attention is paid to the difference in luminosity caused by the color of the object. In the white balance processing disclosed in JP2010-193002A, the white balance correction value is calculated from the strobe emission image data and the strobe non-emission image data. However, the difference in luminosity caused by the color of the object is not considered at all in white balance processing.

The invention has been made in view of the above-mentioned problems and an object of the invention is to provide an image processing technique that can compensate for a difference in luminosity caused by the color of an object in image data to be processed and a technique related to the image processing technique.

According to an aspect of the invention, there is provided an image processing device comprising: a flash image component acquisition unit that acquires flash image component data indicating a flash light image component of an object on the basis of first image data which is acquired by capturing an image of the object while flash light is emitted: a flash correction data acquisition unit that acquires flash correction data, in which a difference in luminosity of the flash image component data caused by a color of the object has been reflected, on the basis of the flash image component data; and a flash luminosity correction unit that acquires flash image correction component data, in which the difference in the luminosity of the flash image component data caused by the color of the object has been compensated for, on the basis of the flash image component data and the flash correction data.

According to this aspect, the flash image correction component data, in which the difference in the luminosity of the flash image component data has been compensated for (corrected) is acquired on the basis of "flash image component data indicating the flash light image component of the object" and the "flash correction data in which the difference in the luminosity of the flash image component data caused by the color of the object has been reflected". Various types of image processing can be performed for the first image data on the basis of the flash image correction component data to obtain the processing result in which the difference in the luminosity of the flash image component data caused by the color of the object has been compensated for.

The "flash image component data indicating the flash light image component of the object" can be represented by, for example, data obtained by removing the influence of environmental light from the data (first image data) of a flash emission image acquired under the influence of flash light and environmental light. The "flash image component data" can be represented by data which directly or indirectly indicates the influence of flash light and may be represented by, for example, data which is affected by light having the same color component ratio as flash light used for imaging.

The "environmental light" indicates a light component other than flash light which has an effect on an object during imaging. The "environmental light" may be light emitted from a single light source or a mixture of light components emitted from a plurality of light sources.

Preferably, the flash image component acquisition unit acquires the flash image component data from first difference data indicating a difference between the first image data and second image data which is acquired by capturing an image of the object without emitting the flash light.

According to this aspect, it is possible to accurately represent the "flash image component data directly indicating the flash light image component of the object", using the first difference data indicating the difference between the "first image data acquired by capturing the image of the object while the flash light is emitted" and the "second image data acquired by capturing the image of the object without emitting the flash light".

Preferably, the flash image component acquisition unit acquires the flash image component data from first difference data indicating a difference between the first image data which is acquired by capturing an image of the object while a first amount of flash light is emitted and second image data which is acquired by capturing an image of the object while a second amount of flash light different from the first amount of flash light is emitted.

According to this aspect, it is possible to accurately acquire the "flash image component data indicating the flash light image component of the object", using the first difference data indicating the difference between the "first image data acquired by capturing the image of the object while the first amount of flash light is emitted" and the "second image data acquired by capturing the image of the object while the second amount of flash light is emitted". In this aspect, it is possible to represent the "flash image component data indirectly indicating the flash light image component of the object", using "data affected by light having the same color component ratio as the flash light".

Preferably, the flash image component acquisition unit applies a white balance gain for flash light to the first difference data to acquire the flash image component data.

According to this aspect, the white balance gain for flash light is applied to the "flash image component data indicating the flash light image component of the object" to adjust the white balance of the flash image component data. Therefore, it is possible to acquire the flash image component data in which the original color of the object has been appropriately reproduced.

Preferably, the flash correction data acquisition unit acquires color ratio data indicating a color component ratio of the flash image component data, which is divided into a plurality of processing blocks, in each of the plurality of processing blocks of the flash image component data, and acquires the flash correction data, in which a difference in luminosity between the plurality of processing blocks of the flash image component data caused by the color of the object has been reflected, on the basis of the color ratio data of the flash image component data.

According to this aspect, it is possible to acquire the flash correction data in a processing block unit.

Preferably, the flash correction data is applied to first luminosity data indicating the luminosity of the flash image component data to compensate for the difference in the luminosity of the flash image component data caused by the color of the object, and the flash correction data acquisition unit acquires the flash correction data for each of the plurality of processing blocks of the flash image component data.

According to this aspect, the first luminosity data indicating the luminosity of the flash image component data can be applied to acquire the flash correction data that can compensate for the difference in the luminosity of the flash image component data caused by the color of the object.

Preferably, the flash luminosity correction unit acquires the first luminosity data in each of the plurality of processing blocks on the basis of the flash image component data and applies the flash correction data to the first luminosity data for each of the plurality of processing blocks to acquire the flash image correction component data.

According to this aspect, the flash correction data is applied to the first luminosity data indicating the luminosity of the flash image component data to acquire the flash image correction component data in which the difference in the luminosity of the flash image component data caused by the color of the object has been compensated for.

Preferably, the flash correction data acquisition unit acquires the flash correction data related to each of the plurality of processing blocks on the basis of the color ratio data of achromatic colors.

According to this aspect, the flash correction data is acquired on the basis of an achromatic color. The achromatic color is "white", "black", or "a mixed color of white and black". In the specification, the concept of "gray" includes "white", "black", and "a mixed color of white and black". In a color space using the primary colors, the amounts of primary colors are equal to each other in the achromatic color. For example, in an RGB color space, an achromatic color has the following relationship: "R data=G data=B data (that is, "R data:G data:B data=1:1:1")".

Preferably, the first image data is acquired by an imaging element including color filters of a plurality of colors. Preferably, the flash image component data includes color component data related to each of the plurality of colors. Preferably, the flash correction data acquisition unit acquires the color ratio data of the flash image component data in each of the plurality of processing blocks on the basis of the color component data.

According to this aspect, it is possible to simply acquire the color ratio data of the flash image component data on the basis of the colors of the color filters in the imaging element used to capture images.

Preferably, the color ratio data of the flash image component data is based on a ratio of the color component data of the flash image component data related to each of the plurality of colors to a sum of the color component data of the plurality of colors of the flash image component data in each of the plurality of processing blocks.

According to this aspect, the color ratio data of the flash image component data can be acquired as data which is normalized on the basis of the sum of the color component data of a plurality of colors of the flash image component data in each of the plurality of processing blocks.

Preferably, on the basis of arithmetic processing which derives luminosity index data indicating the luminosity of the flash image component data corresponding to the color of the object from the color ratio data of the flash image component data, the flash correction data acquisition unit acquires the luminosity index data of the flash image component data in each of the plurality of processing blocks from the color ratio data of the flash image component data in each of the plurality of processing blocks. Preferably, the flash correction data acquisition unit acquires, from the color ratio data of achromatic colors having the same ratio of the color component data related to each of the plurality of colors to the sum of the color component data of the plurality of colors in each of the plurality of processing blocks, the luminosity index data related to the achromatic colors on the basis of the arithmetic processing. Preferably, the flash correction data acquisition unit acquires the flash correction data related to each of the plurality of processing blocks of the flash image component data on the basis of a ratio of the luminosity index data of the flash image component data in each of the plurality of processing blocks to the luminosity index data related to the achromatic colors.

According to this aspect, the flash correction data is acquired on the basis of the ratio of "the luminosity index data of the flash image component data" to "the luminosity index data related to the achromatic colors".

The "arithmetic processing" used to derive the luminosity index data may be a process that can calculate data directly or indirectly indicating luminosity and a predetermined arithmetic expression or a reference table can be used. Therefore, for example, an arithmetic expression used to calculate a "brightness value" may be used as the "arithmetic processing" and the "brightness value" calculated by the arithmetic expression may be used as the "luminosity index data".

Preferably, each of the plurality of processing blocks includes a single pixel.

According to this aspect, it is possible to acquire the flash correction data in a pixel unit. The "pixel" is a unit of the flash image component data and can be based on a pixel forming the imaging element.

Preferably, each of the plurality of processing blocks includes a plurality of pixels.

According to this aspect, it is possible to acquire the flash correction data in the unit of a plurality of pixels. For example, even in a case in which an unexpected noise component is included in each pixel data item forming the flash image component data, a process of acquiring the flash correction data in the unit of a plurality of pixels is performed to substantially reduce the influence of the noise component.

Preferably, the imaging element used to capture the first image data is a single-plate imaging element including color filters of a plurality of colors. Preferably, the color filters of the plurality of colors are formed by repeatedly arranging a basic array with a specific color pattern. Preferably, the plurality of pixels forming each of the plurality of processing blocks correspond to pixels forming the basic array.

According to this aspect, it is possible to acquire the flash correction data on the basis of the basic array of the color filters of the imaging element and to simply perform a flash correction data acquisition process.

Preferably, the image processing device further comprises: an environmental light image component acquisition unit that acquires environmental light image component data indicating an environmental light image component of the object; an environmental light correction data acquisition unit that acquires environmental light correction data, in which a difference in luminosity of the environmental light image component data caused by the color of the object has been reflected, on the basis of the environmental light image component data and an environmental light luminosity correction unit that acquires environmental light image correction component data, in which the difference in the luminosity of the environmental light image component data caused by the color of the object has been compensated for, on the basis of the environmental light image component data and the environmental light correction data.

According to this aspect, the environmental light image correction component data in which the difference in the luminosity of the environmental light image component data has been compensated for is acquired on the basis of "environmental light image component data indicating the environmental light image component of the object" and the "environmental light correction data in which the difference in the luminosity of the environmental light image component data caused by the color of the object has been reflected". Various types of image processing can be performed for the first image data on the basis of the environmental light image correction component data to obtain the processing result in which the difference in the luminosity of the environmental light image component data caused by the color of the object has been compensated for.

The "environmental light image component data indicating the environmental light image component of the object" can be represented by, for example, data obtained by removing the influence of flash light from the data (first image data) of the flash emission image acquired under the influence of flash light and environmental light. The "environmental light image component data" can be represented by data which is affected by light having the same color component ratio as environmental light used to capture and acquire the data of the flash emission image (first image data).

Preferably, the environmental light image component acquisition unit acquires the environmental light image component data, using second image data which is acquired by capturing an image of the object without emitting flash light as basic data.

According to this aspect, it is possible to accurately acquire the environmental light image component data on the basis of the second image data.

The environmental light image component data may be the second image data or other data derived from the second image data.

Preferably, the environmental light image component acquisition unit acquires the environmental light image component data, using second difference data, which indicates a difference between the first image data and the first difference data indicating the difference between the first image data and the second image data acquired by capturing the image of the object without emitting the flash light, as basic data.

According to this aspect, the flash image component data represented by the first difference data is removed from the first image data, which is the data of the flash emission image, to acquire the environmental light image component data.

The environmental light image component acquisition unit may derive basic data on the basis of first image data which is acquired by capturing an image of the object while a first amount of flash light is emitted and first difference data indicating a difference between the first image data and second image data which is acquired by capturing an image of the object while a second amount of flash light different from the first amount of flash light is emitted and may acquire the environmental light image component data on the basis of the basic data.

Preferably, the environmental light image component acquisition unit acquires color ratio data indicating a color component ratio of the basic data in each of the plurality of processing blocks, acquires a white balance gain for environmental light on the basis of the color ratio data of the flash image component data and the color ratio data of the basic data in each of the plurality of processing blocks, and applies the white balance gain for environmental light to the basic data to acquire the environmental light image component data.

According to this aspect, the white balance gain for environmental light is applied to the "environmental light image component data indicating the environmental light image component of the object" to adjust the white balance of the environmental light image component data. Therefore, it is possible to acquire the environmental light image component data in which the color of the object is appropriately reproduced.

Preferably, the white balance gain for environmental light is applied to the color ratio data of the basic data in each of the plurality of processing blocks to derive the color ratio data of the environmental light image component data in each of the plurality of processing blocks.

According to this aspect, the white balance gain for environmental light is used to derive the color ratio data of the environmental light image component data.

Preferably, the environmental light correction data acquisition unit acquires color ratio data indicating a color component ratio of the environmental light image component data in each of the plurality of processing blocks and acquires the environmental light correction data, in which a difference in luminosity between the plurality of processing blocks of the environmental light image component data caused by the color of the object has been reflected, on the basis of the color ratio data of the environmental light image component data.

According to this aspect, it is possible to acquire the environmental light correction data in a processing block unit.

Preferably, the environmental light correction data is applied to second luminosity data indicating the luminosity of the environmental light image component data to compensate for the difference in the luminosity of the environmental light image component data caused by the color of the object, and the environmental light correction data acquisition unit acquires the environmental light correction data for each of the plurality of processing blocks of the environmental light image component data.

According to this aspect, it is possible to acquire the environmental light correction data that is applied to the second luminosity data indicating the luminosity of the environmental light image component data to compensate for the difference in the luminosity of the environmental light image component data caused by the color of the object.

Preferably, the environmental light luminosity correction unit acquires the second luminosity data in each of the plurality of processing blocks on the basis of the environmental light image component data and applies the environmental light correction data to the second luminosity data for each of the plurality of processing blocks to acquire the environmental light image correction component data.

According to this aspect, the environmental light correction data is applied to the second luminosity data indicating the luminosity of the environmental light image component data to acquire the environmental light image correction component data in which the difference in the luminosity of the environmental light image component data caused by the color of the object has been compensated for.

Preferably, the environmental light correction data acquisition unit acquires the environmental light correction data related to each of the plurality of processing blocks on the basis of the color ratio data of achromatic colors.

According to this aspect, the environmental light correction data is acquired on the basis of achromatic colors.

Preferably, the first image data is captured by an imaging element including color filters of a plurality of colors. Preferably, the environmental light image component data includes color component data related to each of the plurality of colors, and the environmental light correction data acquisition unit acquires the color ratio data of the environmental light image component data in each of the plurality of processing blocks on the basis of the color component data.

According to this aspect, it is possible to simply acquire the color ratio data of the environmental light image component data on the basis of the colors of the color filters of the imaging element used to capture images.

Preferably, the color ratio data of the environmental light image component data is based on a ratio of the color component data of the environmental light image component data related to each of the plurality of colors to a sum of the color component data of the plurality of colors of the environmental light image component data in each of the plurality of processing blocks.

According to this aspect, the color ratio data of the environmental light image component data can be acquired as data that is normalized on the basis of the sum of the color component data of a plurality of colors of the environmental light image component data in each of the plurality of processing blocks.

Preferably, on the basis of arithmetic processing which derives luminosity index data indicating the luminosity of the environmental light image component data corresponding to the color of the object from the color ratio data of the environmental light image component data, the environmental light correction data acquisition unit acquires the luminosity index data of the environmental light image component data in each of the plurality of processing blocks from the color ratio data of the environmental light image component data in each of the plurality of processing blocks. Preferably, the environmental light correction data acquisition unit acquires, from the color ratio data of achromatic colors having the same ratio of the color component data related to each of the plurality of colors to the sum of the color component data of the plurality of colors in each of the plurality of processing blocks, the luminosity index data related to the achromatic colors on the basis of the arithmetic processing. Preferably, the environmental light correction data acquisition unit acquires the environmental light correction data related to each of the plurality of processing blocks of the environmental light image component data on the basis of a ratio of the luminosity index data of the environmental light image component data in each of the plurality of processing blocks to the luminosity index data related to the achromatic colors.

According to this aspect, the environmental light correction data is acquired on the basis of the ratio of "the luminosity index data of the environmental light image component data" to "the luminosity index data related to the achromatic colors".

The "arithmetic processing" used to derive the luminosity index data may be a process that can calculate data directly or indirectly indicating luminosity. Therefore, an arithmetic expression used to calculate a "brightness value" may be used for the "arithmetic processing" and the "brightness value" calculated by the arithmetic expression may be used as the "luminosity index data".

Preferably, the image processing device further comprises a white balance processing unit that adjusts a white balance of the first image data on the basis of the flash image correction component data.

According to this aspect, it is possible to adjust the white balance of the first image data on the basis of the flash image correction component data in which the difference in the luminosity of the flash image component data caused by the color of the object has been compensated for.

Preferably, the white balance processing unit applies a white balance gain for flash light to the first image data on the basis of the flash image correction component data.

According to this aspect, the white balance gain for flash light is applied to the first image data on the basis of the flash image correction component data in which the difference in the luminosity of the flash image component data caused by the color of the object has been compensated for.

Preferably, the image processing device further comprises a white balance processing unit that adjusts a white balance of the first image data on the basis of the flash image correction component data and the environmental light image correction component data.

According to this aspect, it is possible to adjust the white balance of the first image data on the basis of the "flash image correction component data in which the difference in the luminosity of the flash image component data caused by the color of the object has been compensated for" and the "environmental light image correction component data in which the difference in the luminosity of the environmental light image component data caused by the color of the object has been compensated for".

Preferably, the white balance processing unit applies the white balance gain for flash light and the white balance gain for environmental light to the first image data on the basis of the flash image correction component data and the environmental light image correction component data.

According to this aspect, the white balance gain for flash light and the white balance gain for environmental light are applied to the first image data on the basis of the "flash image correction component data in which the difference in the luminosity of the flash image component data caused by the color of the object has been compensated for" and the "environmental light image correction component data in which the difference in the luminosity of the environmental light image component data caused by the color of the object has been compensated for".

Preferably, the luminosity is brightness.

According to this aspect, the flash image correction component data in which a difference in the brightness of the flash image component data caused by the color of the object has been compensated for is acquired.

Another aspect of the invention relates to an imaging device comprising an imaging element and the above-mentioned image processing device.

Still another aspect of the invention relates to an image processing method comprising: a step of acquiring flash image component data indicating a flash light image component of an object from first image data which is acquired by capturing an image of the object while flash light is emitted; a step of acquiring flash correction data, in which a difference in luminosity of the flash image component data caused by a color of the object has been reflected, on the basis of the flash image component data; and a step of acquiring flash image correction component data, in which the difference in the luminosity of the flash image component data caused by the color of the object has been compensated for, on the basis of the flash image component data and the flash correction data.

Yet another aspect of the invention relates to a program that causes a computer to perform: a step of acquiring flash image component data indicating a flash light image component of an object from first image data which is acquired by capturing an image of the object while flash light is emitted; a step of acquiring flash correction data, in which a difference in luminosity of the flash image component data caused by a color of the object has been reflected, on the basis of the flash image component data; and a step of acquiring flash image correction component data, in which the difference in the luminosity of the flash image component data caused by the color of the object has been compensated for, on the basis of the flash image component data and the flash correction data.

According to the invention, it is possible to acquire the flash image correction component data in which a difference in the luminosity of the flash image component data caused by the color of the object has been compensated for. When various types of image processing including white balance processing are performed using the "flash image correction component data in which the difference in the luminosity of the flash image component data caused by the color of the object has been compensated for", it is possible to compensate for a difference in luminosity caused by the color of the object and to improve the accuracy of the process.

BRIEF DESCRIPTION OF THE DRAWINGS

FIG. 4A is a diagram illustrating the relationship between the brightness values of image data related to a gray object and a blue object and FIG. 4B is a diagram illustrating the relationship between the brightness values of the image data after a difference in the luminosity (brightness) of the image data caused by the color of the object is compensated.

FIG. 10 is a conceptual diagram illustrating the planar structure of a plurality of pixels forming an imaging element.

FIGS. 11A and 11B are plan views illustrating examples of the basic array of color filters. FIG. 11A illustrates a basic array pattern of a Bayer array and FIG. 11B illustrates a basic array pattern of an X-Trans (registered trademark) type.

FIG. 12 is a block diagram illustrating the functional structure of a flash correction data acquisition unit according to the second embodiment.

FIG. 22 is a block diagram illustrating the functional structure of an environmental light correction data acquisition unit.

FIG. 23 is a block diagram illustrating the functional structure of a second color ratio data acquisition unit.

FIG. 24 is a block diagram illustrating the functional structure of a second correction data calculation unit.

DESCRIPTION OF THE PREFERRED EMBODIMENTS

Embodiments of the invention will be described with reference to the drawings. In the following embodiments, an example in which the invention is applied to a digital camera (imaging device) will be described. However, the invention can be applied to an image processing device, an imaging device, an image processing method, and a program, in addition to the digital camera.

Figure 1:
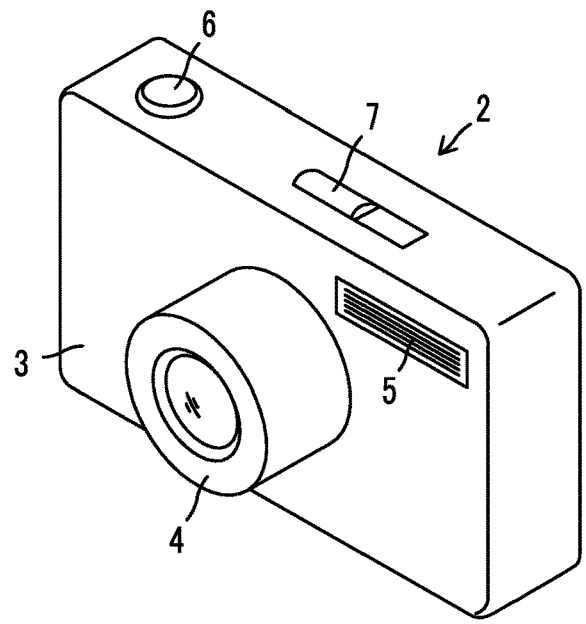
FIG. 1 is a front perspective view illustrating a digital camera.
Figure 2:
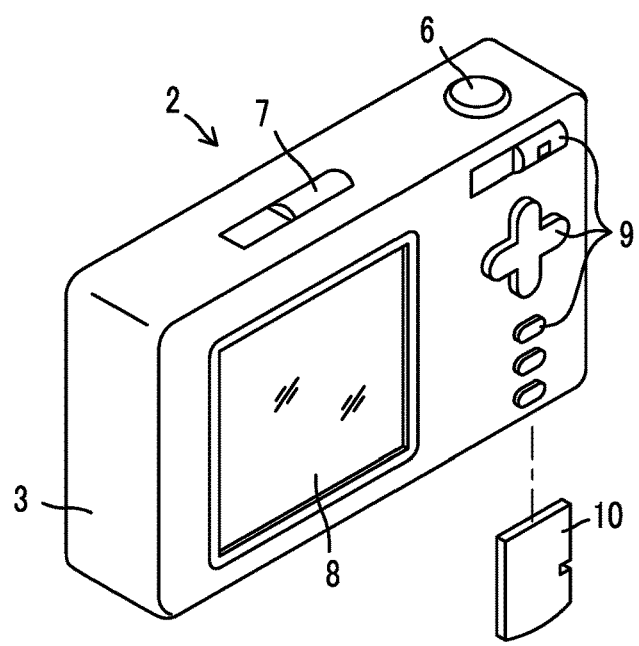
FIG. 2 is a rear perspective view illustrating the digital camera.

FIG. 1 is a front perspective view illustrating a digital camera 2. FIG. 2 is a rear perspective view illustrating the digital camera 2.

The digital camera 2 comprises a camera body 3 and a lens barrel 4 that is attached to a front surface of the camera body 3. The camera body 3 and the lens barrel 4 may be integrally provided or may be detachably and attachably provided as an interchangeable lens camera.

In addition to the lens barrel 4, a flash light emitting unit 5 is provided on the front surface of the camera body 3. A shutter button 6 and a power switch 7 are provided on an upper surface of the camera body 3. The shutter button 6 is an imaging instruction unit that receives an imaging instruction from a user. The power switch 7 is a power switching unit that receives an instruction to turn on and off the digital camera 2 from the user. The flash light emitting unit 5 may be a flash device that is provided in the digital camera 2 (camera body 3) or may be an external flash device.

A display unit 8 which is, for example, a liquid crystal panel and an operating unit 9 which is directly operated by the user are provided on a rear surface of the camera body 3. The display unit 8 displays a live view image (through-image) in an imaging standby state to function as an electronic viewfinder and functions as a playback image display unit when a captured image or a memory-stored image is played back.

The operating unit 9 is an arbitrary operating device, such as a mode switch, a cross key, and an execution key. For example, the mode switch is operated by the user to switch the operation mode of the digital camera 2. Examples of the operation mode of the digital camera 2 include an imaging mode in which an image of an object is captured to obtain a captured image and a playback mode in which an image is played back and displayed. Examples of the imaging mode include an auto focus (AF) mode in which auto focus is performed and a manual focus (MF) mode in which a manual focus operation is performed. The cross key and the execution key are operated by the user to display a menu screen or a setting screen on the display unit 8, to move a cursor displayed on the menu screen or the setting screen, or to confirm various types of settings of the digital camera 2.

A memory slot into which a main memory 10 is inserted and a cover that opens and closes an opening of the memory slot are provided at the bottom (not illustrated) of the camera body 3. The main memory 10 is detachably and attachably provided in the camera body 3. When the main memory 10 is inserted into the camera body 3, it is electrically connected to a storage control unit 33 (see FIG. 3) provided in the camera body 3. The main memory 10 can be generally a semiconductor memory, such as a card-type flash memory. The main memory 10 is not particularly limited. For example, a recording medium of an arbitrary storage type, such as a magnetic medium, can be used as the main memory 10.

Figure 3:
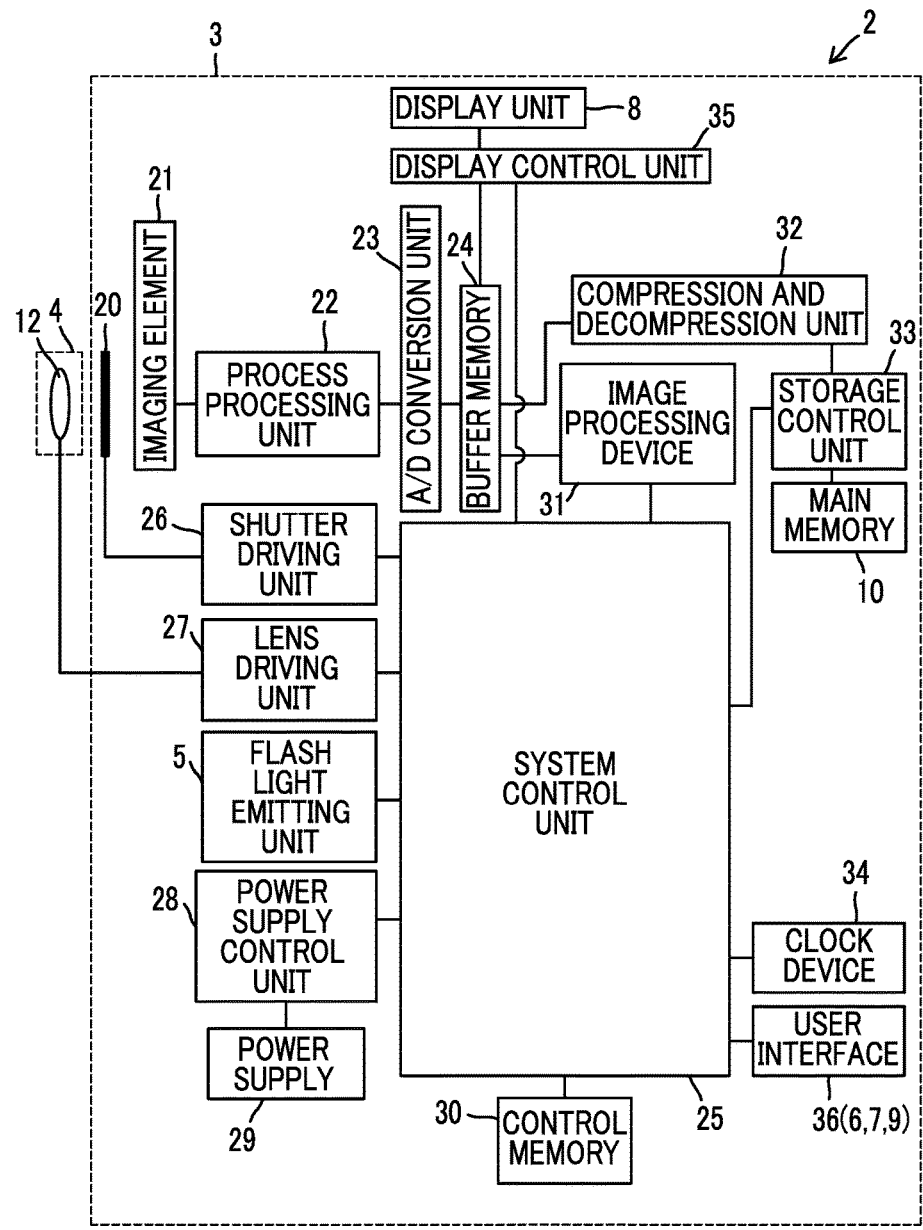
FIG. 3 is a block diagram illustrating a control processing system of the digital camera.

FIG. 3 is a block diagram illustrating a control processing system of the digital camera 2.

Object light passes through a lens unit 12 that is provided in the lens barrel 4 and a mechanical shutter 20 that is provided in the camera body 3 and is received by an imaging element 21. The lens unit 12 is formed by an imaging optical system including an imaging lens (lens group) and a diaphragm. The imaging element 21 is an element that receives the object image and generates image data and includes color filters, such as red, green, and blue (R, G, and B) filters, and an image sensor (photodiode), such as a charge coupled device (CCD) or a complementary metal oxide semiconductor (CMOS), which converts an optical image into an electric signal. For example, an automatic gain control (AGC) circuit of a process processing unit 22 performs process processing for image data that is output from the imaging element 21 and an A/D conversion unit 23 converts analog image data into digital image data. The digital image data is stored in a buffer memory 24.

The buffer memory 24 is an area that temporarily stores the image data and is, for example, a dynamic random access memory (DRAM). The image data that has been transmitted from the A/D conversion unit 23 and then stored in the buffer memory 24 is read by an image processing device 31 which is controlled by a system control unit 25.

The image processing device 31 performs various types of image processing, such as white balance processing which will be described below, gamma-correction processing, and a demosaicing process, for the image data read from the buffer memory 24 and stores the image data subjected to the image processing in the buffer memory 24 again.

The image data which has been subjected to the image processing by the image processing device 31 and then stored in the buffer memory 24 is read by a display control unit 35 and a compression and decompression unit 32. The display control unit 35 controls the display unit 8 such that the image data read from the buffer memory 24 is displayed on the display unit 8. As such, the image data which has been output from the imaging element 21 and then subjected to the image processing by the image processing device 31 is displayed as an imaging check image (post-view image) on the display unit 8.

The compression and decompression unit 32 compresses the image data read from the buffer memory 24 to create image data with an arbitrary compression format, such as Joint Photographic Experts Group (JPEG) or Tagged Image File Format (TIFF). The compressed image data is stored in the main memory 10 by the storage control unit 33 that controls a process of storing data in the main memory 10 and a process of reading data from the main memory 10. In a case in which data, such as image data, is stored in the main memory 10, the storage control unit 33 adds imaging information, such as editing date and time information (update date and time information), or other kinds of related information to the data, on the basis of date and time information acquired from a clock device 34 through the system control unit 25. The related information including the imaging information is added to the image data in any format. For example, an exchangeable image file format (Exif) can be used.

In the playback mode in which the image data stored in the main memory 10 is played back, the image data stored in the main memory 10 is read by the storage control unit 33 that is controlled by the system control unit 25, is decompressed by the compression and decompression unit 32, and is then stored in the buffer memory 24. The image data is read from the buffer memory 24 by the display control unit 35 and is played back and displayed on the display unit 8 in the same order as that in which a captured image is checked and displayed.

The system control unit 25 controls the buffer memory 24, the image processing device 31, and the storage control unit 33 as described above. In addition, the system control unit 25 controls other units in the digital camera 2. For example, the system control unit 25 controls a lens driving unit 27 to control the driving of the lens unit 12 and controls a shutter driving unit 26 to control the driving of the mechanical shutter 20. In addition, the system control unit 25 controls the imaging element 21 to control the output of image data. Further, the system control unit 25 controls the flash light emitting unit 5 to control the emission or non-emission of flash light, and controls a power control unit 28 to detect, for example, whether a battery is mounted on a power supply 29, the type of battery, and a remaining battery level. Furthermore, the system control unit 25 acquires the date and time information which is counted by the clock device 34 and uses the date and time information in various types of processes. In addition, the system control unit 25 controls various processing units forming the image processing device 31.

The system control unit 25 acquires an operation signal from a user interface 36 including the shutter button 6, the power switch 7, and the operating unit 9 and performs various types of processes and device control corresponding to the operation signal. For example, the system control unit 25 controls the shutter driving unit 26 to control the opening and closing of the mechanical shutter 20 in response to a release signal received from the shutter button 6. Furthermore, the system control unit 25 controls the power control unit 28 to control the turn-on and tune-off of the power supply 29 in response to a power on/off signal received from the power switch 7.

Programs and data required for various types of processes and device control performed by the system control unit 25 are stored in a control memory 30. The system control unit 25 can read the programs or the data stored in the control memory 30, if necessary. In addition, the system control unit 25 can store a new program or data in the control memory 30. For example, the system control unit 25 can write condition data, such as the type of set white balance mode or a white balance gain, to the control memory 30. The system control unit 25 can control the display control unit 35 such that various kinds of information acquired from each unit are displayed on the display unit 8. In addition, the system control unit 25 can change various kinds of information to be displayed on the display unit 8, in response to an operation signal which is input from the user through the user interface 36.

Next, white balance processing in the image processing device 31 will be described.

In each of the following embodiments, white balance processing will be described as an example of image processing. The following image processing process can also be applied to processes other than the white balance processing.

In each of the following embodiments, in white balance processing for a flash emission image, a correction process for compensating for (correcting) a difference in luminosity caused by the color of an object is performed. In each of the following embodiments, "brightness" is used as the "luminosity" of image data.

Figure 4:
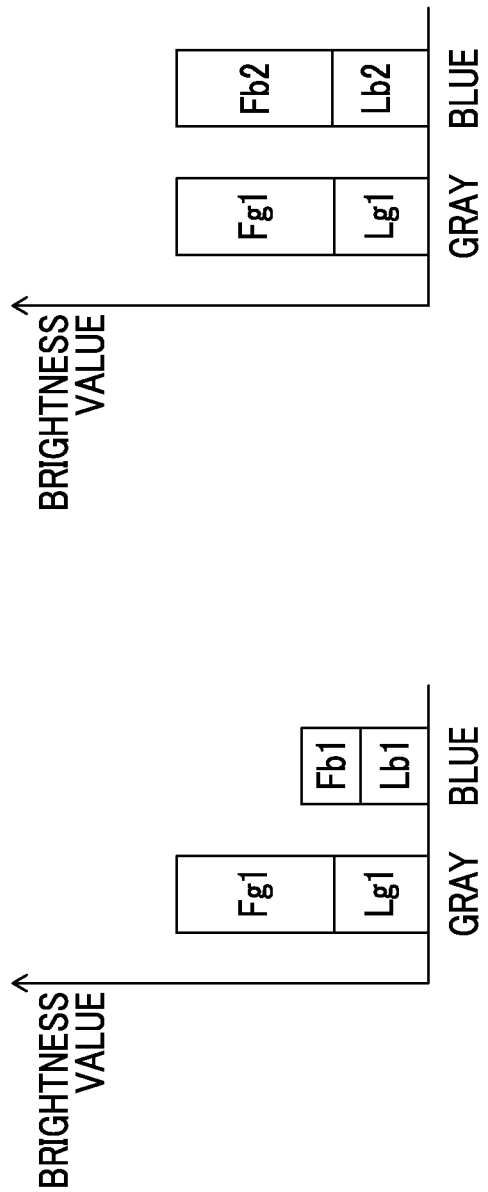
FIGS. 4A and 4B are diagrams illustrating a difference in the luminosity (brightness) of image data caused by the color of an object.

FIGS. 4A and 4B are diagrams illustrating a difference in the luminosity (brightness) of image data caused by the color of an object. FIG. 4A is a diagram illustrating the relationship between the brightness values of image data related to a gray (achromatic) object and a blue (chromatic) object and FIG. 4B is a diagram illustrating the relationship between the brightness values of image data after the difference in the luminosity of image data caused by the color of the object. In FIGS. 4A and 4B, the vertical axis indicates the brightness value of the image data related to each of the gray object and the blue object. FIGS. 4A and 4B illustrate a case in which the gray object and the blue object are equidistant from the flash light emitting unit. In FIGS. 4A and 4B. "Fg1" conceptually indicates a portion of the brightness of the image data of the gray object to which flash light contributes and "Lg1" conceptually indicates a portion of the brightness of the image data of the gray object to which environmental light contributes. In addition, "Fb1" and "Fb2" conceptually indicate portions of the brightness of the image data of the blue object to which flash light contributes and "Lb1" and "Lb2" conceptually indicate portions of the brightness of the image data of the blue object to which environmental light contributes.

In general, the "amount of influence of flash light (see "Fg1" and "Fb1" in FIG. 4A)" and the "amount of influence of environmental light (see "Lg1" and "Lb1" in FIG. 4A)" in image data vary depending on the distance between the flash light emitting unit 5 and the object. In addition, the brightness of an image depends on the color of the object. When the color of the object changes, the amount of influence of flash light and the amount of influence of environmental light in the image change even if the distance between the flash light emitting unit 5 and the object is the same. Therefore, in the example illustrated in FIG. 4A, in the image data of the gray object and the image data of the blue object, the sizes of brightness portions to which flash light contributes are not equal to each other (that is. "Fg1≠Fb1") and the sizes of brightness portions to which environmental light contributes are not equal to each other (That is, "Lg1*Lb1"). In addition, the overall brightness values are different from each other (that is, "Fg1+Lg1≠Fb1+Lb1").

In each of the following embodiments, a process is performed which compensates for a difference in the brightness (luminosity) of image data caused by the color of an object such that at least one of the following Expressions 1 to 3 is satisfied, as illustrated in FIG. 4B:

"$Fg1=Fb2$ (where "$Fb2=Fb1\times$correction data for flash light (flash correction data)")"; [Expression 1]

"$Lg1=Lb2$ (where "$Lb2=Lb1\times$correction data for environmental light (environmental light correction data)")"; and [Expression 2]

"$Fg1+Lg1=Fb2+Lb2$". [Expression 3]

As such, for example, the influence of a difference in luminosity depending on the color of an object is removed such that at least one of the above-mentioned Expressions 1 to 3 is satisfied. Therefore, it is possible to acquire accurate "image data indicating the influence of flash light" and image processing is performed using the image data to compensate for a difference in the brightness (luminosity) of the image data.

As described above, the image processing device 31 performs image processing in addition to white balance processing. However, white balance processing will be mainly described below and the description of image processing other than the white balance processing will be omitted.

First Embodiment

Figure 5:
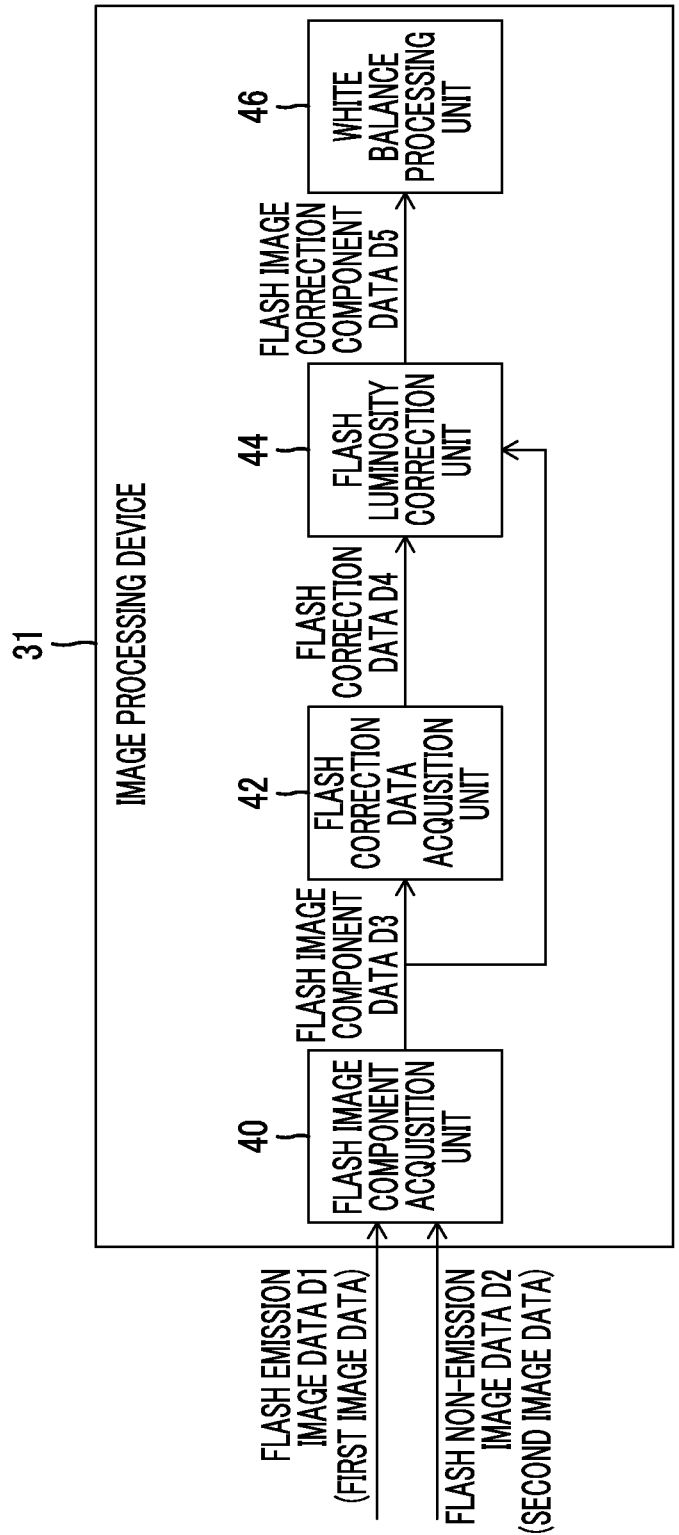
FIG. 5 is a block diagram illustrating the functional structure of an image processing device according to a first embodiment.

FIG. 5 is a block diagram illustrating the functional structure of the image processing device 31 according to a first embodiment. The image processing device 31 according to this embodiment includes a flash image component acquisition unit 40, a flash correction data acquisition unit 42, a flash luminosity correction unit 44, and a white balance processing unit 46.

The flash image component acquisition unit 40 acquires flash image component data (RGB flash influence map) D3 indicating a flash light image component of an object, on the basis of first image data (flash emission image data D1) acquired by capturing an image of the object while flash light is emitted.

A detailed method for acquiring the flash image component data D3 in the flash image component acquisition unit 40 is not particularly limited. For example, the flash image component acquisition unit 40 can use difference data between the "flash emission image data D1 (first image data)" and "flash non-emission image data D2 (second image data) acquired by capturing an image of the object without emitting flash light" as the flash image component data D3. The flash image component data D3 is "image data indicating the influence of flash light" obtained by cancelling the influence of environmental light from the flash emission image data D1. That is, a region which is not affected by flash light and is affected by only environmental light is excluded from the flash emission image and a region which is affected by flash light is separated from the flash emission image. Data of the separated region is the flash image component data D3.

A method for acquiring the flash emission image data D1 and the flash non-emission image data D2 in the flash image component acquisition unit 40 is not particularly limited. For example, the flash emission image data D1 and the flash non-emission image data D2 which are related to the same object and are continuously captured and acquired may be supplied from the imaging element 21 (see FIG. 3) to the flash image component acquisition unit 40 of the image processing device 31 through the process processing unit 22, the A/D conversion unit 23, and the buffer memory 24. In addition, the flash image component acquisition unit 40 may acquire, as a processing target, the flash emission image data D1 and the flash non-emission image data D2 which are related to the same object and are stored in the main memory 10. In this case, the flash emission image data D1 and the flash non-emission image data D2 stored in the main memory 10 are read by the storage control unit 33, are decompressed by the compression and decompression unit 32, and are supplied to the flash image component acquisition unit 40 of the image processing device 31 through the buffer memory 24.

In addition, various conditions, such as the imaging and acquisition conditions, the image type, and the image size of the flash emission image data D1 and the flash non-emission image data D2 supplied to the image processing device 31 (flash image component acquisition unit 40), are not particularly limited. That is, the flash emission image data D1 and the flash non-emission image data D2 supplied to the image processing device 31 (flash image component acquisition unit 40) may be any image data which is captured and acquired under any imaging conditions as long as they are "image data captured and acquired while flash light is emitted" and "image data captured and acquired without emitting flash light", respectively. For example, the flash emission image data D1 and the flash non-emission image data D2 may be still image data or moving image data. In addition, the flash non-emission image data D2 may be live view image data or image data which is captured and acquired during a high-speed operation, such as image data for dimming flash light.

A process for supplying the flash emission image data D1 and the flash non-emission image data D2 to the image processing device 31 (flash image component acquisition unit 40) is appropriately performed under the control of the system control unit 25 (see FIG. 3).

An example of the structure of the flash image component acquisition unit 40 that acquires the flash image component data D3 will be described in detail in a second embodiment which will be described below.

The flash correction data acquisition unit 42 illustrated in FIG. 5 acquires flash correction data (flash influence map for each color) D4 in which a difference in the luminosity of the flash image component data D3 caused by the color of the object has been reflected, on the basis of the flash image component data D3. The flash correction data D4 may be numerical data (for example, a gain value) for removing the influence (difference in luminosity) of the color of the object.

The flash luminosity correction unit 44 acquires flash image correction component data (composite flash influence map) D5 in which a difference in the luminosity of the flash image component data D3 caused by the color of the object has been compensated for, on the basis of the flash image component data D3 and the flash correction data D4. The flash image correction component data D5 is "(image) data indicating the influence of flash light" obtained by adjusting the flash image component data D3 on the basis of the flash correction data D4 and compensating for a difference in brightness based on spectral characteristics corresponding to the color of the object.

Examples of the structures of the flash correction data acquisition unit 42 and the flash luminosity correction unit 44 or examples of the flash correction data D4 and the flash image correction component data D5 will be described in detail in the second embodiment and a third embodiment which will be described below.

The white balance processing unit 46 adjusts the white balance of the flash emission image data (first image data) D1 on the basis of the flash image correction component data D5. For example, a region that is strongly affected by flash light and a region that is weakly affected by flash light in the flash emission image data D1 can be estimated from the flash image correction component data D5. Therefore, the white balance processing unit 46 can determine a region that is relatively strongly affected by flash light in the flash emission image data (first image data) D1 on the basis of the flash image correction component data D5 and can apply a white balance gain for flash light to the image data (flash emission image data (first image data) D1) of the "region that is relatively strongly affected by flash light".

A detailed white balance processing method in the white balance processing unit 46 is not particularly limited. For example, white balance processing which removes only the influence of flash light in the flash emission image data D1 may be performed or white balance processing which removes the influence of flash light and environmental light in the flash emission image data D1 may be performed. Specifically, the white balance gain for flash light may be applied to the region that is relatively strongly affected by flash light in the flash emission image data D1. In this case, the white balance gain may not be applied to a region other than the "region that is relatively strongly affected by flash light" or a white balance gain for environmental light may be applied to the region. In addition, the ratio of the influence of flash light to the influence of environmental light in each region of the flash emission image data D1 may be calculated and both the white balance gain for flash light and the white balance gain for environmental light may be applied to each region on the basis of the ratio.

Figure 6:
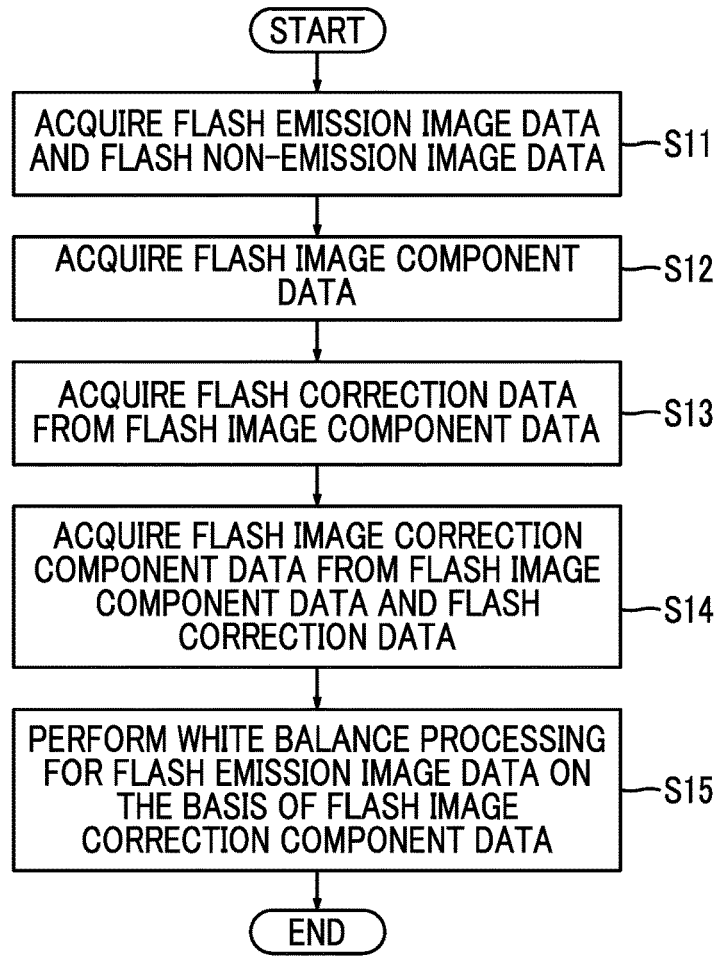
FIG. 6 is a flowchart illustrating white balance processing according to the first embodiment.

FIG. 6 is a flowchart illustrating white balance processing according to the first embodiment.

First, the flash image component acquisition unit 40 acquires the flash emission image data D1 and the flash non-emission image data D2 (S11 in FIG. 6) and acquires the flash image component data (RGB flash influence map) D3 from the flash emission image data D1 and the flash non-emission image data D2 (S12).

Then, the flash correction data acquisition unit 42 acquires the flash correction data D4 from the flash image component data D3 (S13). The flash luminosity correction unit 44 acquires the flash image correction component data D5 from the flash image component data D3 and the flash correction data D4 (S14).

Then, the white balance processing unit 46 performs white balance processing corresponding to the flash image correction component data D5 for the flash emission image data D1 (S15).

As described above, according to the image processing device 31 and the image processing method of this embodiment, flash correction data for removing the influence of, for example, a difference in brightness (luminosity) caused by the color of the object is acquired and flash image correction component data indicating the influence of flash light is acquired considering the flash correction data. The use of the flash image correction component data makes it possible to perform white balance processing for the flash emission image data D1 with high accuracy.

Second Embodiment

In this embodiment, the same or similar components as those in the first embodiment are denoted by the same reference numerals and the detailed description thereof will not be repeated.

In this embodiment, a process is performed which adjusts the luminosity (brightness) of a captured image of an achromatic (gray) object on the basis of the spectral characteristics (spectral reflectivity) of the object to compensate for a difference in the luminosity of image data caused by the color of the object.

An image processing device 31 according to this embodiment comprises a flash image component acquisition unit 40, a flash correction data acquisition unit 42, a flash luminosity correction unit 44, and a white balance processing unit 46, similarly to the image processing device 31 according to the first embodiment illustrated in FIG. 5. Among these units, the flash image component acquisition unit 40 and the flash correction data acquisition unit 42 have the following detailed structure.

First, an aspect of the detailed structure of the flash image component acquisition unit 40 will be described.

The flash image component acquisition unit 40 according to this embodiment acquires flash image component data D3 from first difference data indicating the difference between flash emission image data (first image data) D1 which is acquired by capturing an image of an object while flash light is emitted and flash non-emission image data D2 (second image data) which is acquired by capturing an image of the object without emitting flash light. In particular, the flash image component acquisition unit 40 according to this embodiment applies a white balance gain for flash light to the first difference data to acquire the flash image component data D3.

Figure 7:
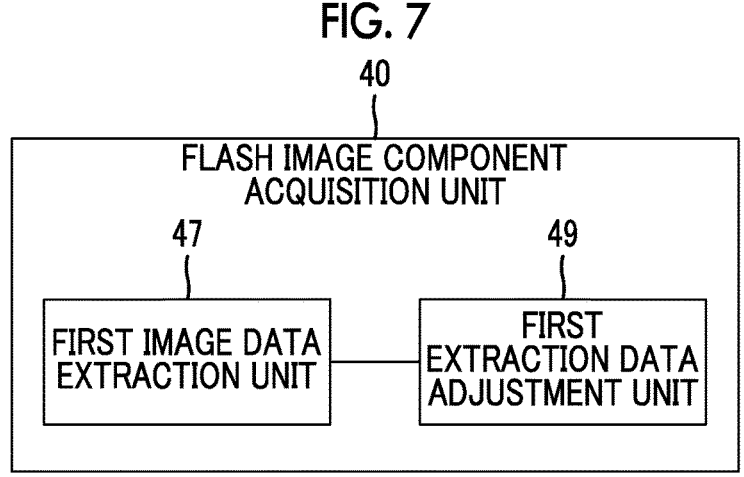
FIG. 7 is a block diagram illustrating the functional structure of a flash image component acquisition unit according to a second embodiment.

FIG. 7 is a block diagram illustrating the functional structure of the flash image component acquisition unit 40 according to the second embodiment. The flash image component acquisition unit 40 according to this embodiment includes a first image data extraction unit 47 and a first extraction data adjustment unit 49. The first image data extraction unit 47 acquires the first difference data indicating the difference between the flash emission image data D1 and the flash non-emission image data D2. The first extraction data adjustment unit 49 applies the white balance gain for flash light to the first difference data to acquire the flash image component data D3.

Figure 8:
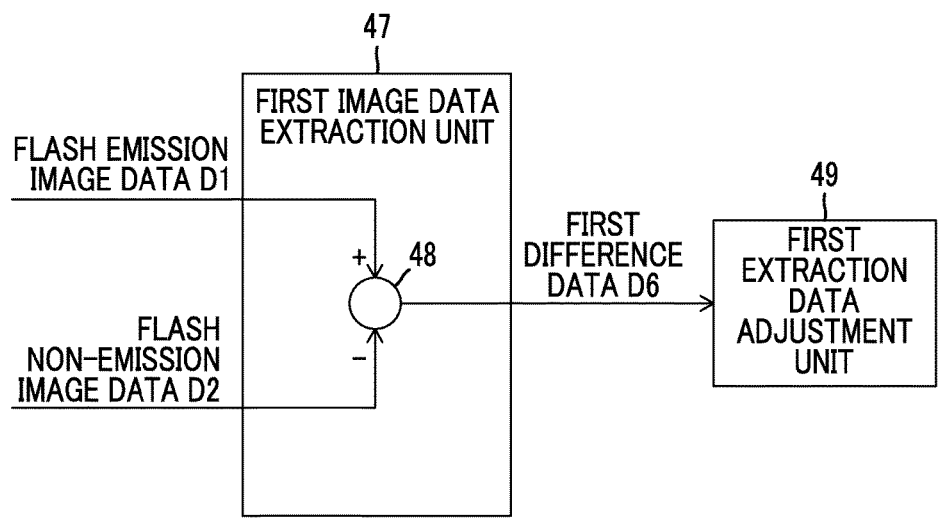
FIG. 8 is a block diagram illustrating an example of the structure of a first image data extraction unit of the flash image component acquisition unit.

FIG. 8 is a diagram illustrating an example of the structure of the first image data extraction unit 47 of the flash image component acquisition unit 40. The first image data extraction unit 47 according to this embodiment includes a subtracter 48. The subtracter 48 receives the flash emission image data D1 and the flash non-emission image data D2 and calculates first difference data D6 represented by the "first difference data (first RGB flash influence map) D6=the flash emission image data D1−the flash non-emission image data D2". The first difference data D6 calculated by the subtracter 48 is transmitted from the first image data extraction unit 47 to the first extraction data adjustment unit 49.

Figure 9:
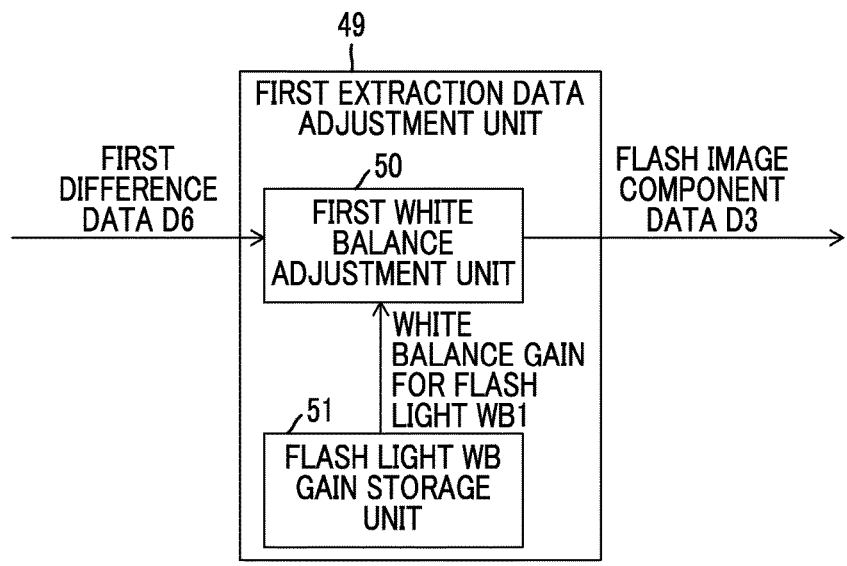
FIG. 9 is a block diagram illustrating an example of the structure of a first extraction data adjustment unit of the flash image component acquisition unit.

FIG. 9 is a block diagram illustrating an example of the structure of the first extraction data adjustment unit 49 of the flash image component acquisition unit 40. The first extraction data adjustment unit 49 according to this embodiment includes a first white balance adjustment unit 50 and a flash light WB gain storage unit 51. The first white balance adjustment unit 50 reads a white balance gain WB1 for flash light which is stored in the flash light WB gain storage unit 51 and applies the white balance gain WB1 for flash light to the first difference data D6 to acquire the flash image component data (second RGB flash influence map) D3.

The flash image component data D3 which has been acquired through the first image data extraction unit 47 and the first extraction data adjustment unit 49 in this way is "image data indicating the influence of flash light" subjected to white balance correction corresponding to the spectral characteristics of flash light. Therefore, the flash image component acquisition unit 40 according to this embodiment outputs the flash image component data D3 of which the gray balance has been adjusted.

A method for acquiring the white balance gain WB1 for flash light and storing the white balance gain WB1 for flash light in the flash light WB gain storage unit 51 is not particularly limited. For example, in a case in which the flash light emitting unit 5 (see FIGS. 1 and 3) is a flash device provided in the digital camera 2 (camera body 3), the spectral characteristics of flash light are known. Therefore, for example, when the digital camera 2 (camera body 3) is manufactured, the white balance gain WB1 for flash light can be acquired in advance and can be stored in the flash light WB gain storage unit 51. In a case in which the flash light emitting unit 5 is an external flash device, the user can take an image of, for example, a gray card while flash light is emitted, can acquire an appropriate white balance gain WB1 for flash light from the captured image data in advance, and can store the white balance gain WB1 for flash light in the flash light WB gain storage unit 51.

The first image data extraction unit 47 (flash image component acquisition unit 40) may acquire the flash image component data D3 using the flash emission image data, without using the flash non-emission image data D2. That is, the flash image component acquisition unit 40 may acquire the flash image component data D3 from first difference data indicating the difference between first image data (flash emission image data D1) which is acquired by capturing an image of the object while a first amount of flash light is emitted and second image data (flash emission image data) which is acquired by capturing an image of the object while a second amount of flash light different from the first amount of flash light is emitted.

Next, the unit of processing (processing block) of the flash image component data D3 in the flash correction data acquisition unit 42 (see FIG. 5) will be described.

FIG. 10 is a conceptual diagram illustrating the planar structure of a plurality of pixels 14 forming the imaging element 21. The imaging element 21 includes the plurality of pixels 14 which are two-dimensionally arranged and each pixel 14 includes a color filter and an image sensor. The image data captured and acquired by the imaging element 21 is a set of pixel data (pixel values) output from each of the pixels 14 (image sensors). Therefore, each of the flash emission image data D1, the flash non-emission image data D2, the first difference data D6, and the flash image component data D3 is a set of pixel data.

The flash correction data acquisition unit 42 according to this embodiment divides the flash image component data D3 into a plurality of processing blocks and performs a process. Each of the plurality of processing blocks may include a single pixel or a plurality of pixels. In a case in which each processing block includes a single pixel, for example, the flash correction data acquisition unit 42 performs the following process for each pixel. In contrast, in a case in which each processing block includes a plurality of pixels, for example, the flash correction data acquisition unit 42 performs the following process for "a plurality of pixels forming each processing block".

In a case in which each of the plurality of processing blocks includes a plurality of pixels, it is preferable that the plurality of pixels forming each of the plurality of processing blocks correspond to the pixels 14 forming a basic array of color filters 16 of the imaging element 21. That is, the imaging element 21 used to capture the flash emission image data (first image data) D1 is a single-plate imaging element including a plurality of color filters such as R, G, and B color filters. In a case in which the plurality of color filters are formed by repeatedly arranging a basic array of specific color patterns, it is preferable that each processing block is determined so as to correspond to the basic array of the color filters.

FIGS. 11A and 11B are plan views illustrating examples of the basic array of the color filters 16. FIG. 11A illustrates a basic array pattern of a Bayer array and FIG. 11B illustrates a basic array pattern of an X-Trans (registered trademark) array. In FIG. 11A, "R" indicates a red (R) color filter 16. "B" indicates a blue (B) color filter 16, and "G1" and "G2" indicate green (G) color filters 16. In FIG. 11B, "R1" to "R8" indicate red (R) color filters 16, "B1" to "B8" indicate blue (B) color filters 16, and "G1" to "G20" indicate green (G) color filters 16.

For example, in a case in which the imaging element 21 includes the color filters 16 arranged in the Bayer array, it is preferable that each processing block includes 2×2 pixels (a total of four pixels) as illustrated in FIG. 11A. In contrast, in a case in which the imaging element 21 includes the X-Trans color filters 16, it is preferable that each processing block includes 6×6 pixels (a total of 36 pixels) as illustrated in FIG. 11B.

A pixel unit forming each processing block in the process of, for example, the flash correction data acquisition unit 42 may be the same as a pixel unit forming each processing block in the white balance processing of the white balance processing unit 46 which will be described below. That is, in a case in which each processing block includes a single pixel in the white balance processing, each processing block may also include a single pixel in the process of, for example, the flash correction data acquisition unit 42. In a case in which each processing block includes a plurality of pixels forming the basic array of the color filters 16 in the white balance processing, each processing block may also include a plurality of pixels forming the basic array of the color filters 16 in the process of, for example, the flash correction data acquisition unit 42.

In the following description, an example in which each processing block includes a single pixel will be described. In a case in which each processing block includes a plurality of pixels, basically, the same process as described above is performed. Therefore, for a process in a case in which each processing block includes a plurality of pixels, in some cases, the "pixel" is also referred to as a "region including a plurality of pixels". In the following description, for convenience of explanation, the region is referred to as a "pixel".

Next, an aspect of the detailed structure of the flash correction data acquisition unit 42 will be described.

The flash correction data acquisition unit 42 according to this embodiment acquires luminosity index data (brightness data) from color ratio data (for example, an RGB ratio) of the flash image component data acquired for each processing block and acquires flash correction data (correction gain) for compensating for a difference in luminosity (brightness) between colors from the luminosity index data, in order to reduce an influence which depends on the color based on the spectral characteristics (spectral reflectivity) of the object.

FIG. 12 is a block diagram illustrating the functional structure of the flash correction data acquisition unit 42 according to the second embodiment.

The flash correction data acquisition unit 42 according to this embodiment includes a first color ratio data acquisition unit 53 and a first correction data calculation unit 54. The first color ratio data acquisition unit 53 acquires color ratio data D7 indicating a color component ratio of the flash image component data D3 in each of the plurality of processing blocks from the flash image component data D3. The first correction data calculation unit 54 acquires flash correction data D4 in which a difference in luminosity between a plurality of processing blocks of the flash image component data D3 caused by the color of the object has been reflected, on the basis of the color ratio data D7 of the flash image component data D3.

Figure 13:
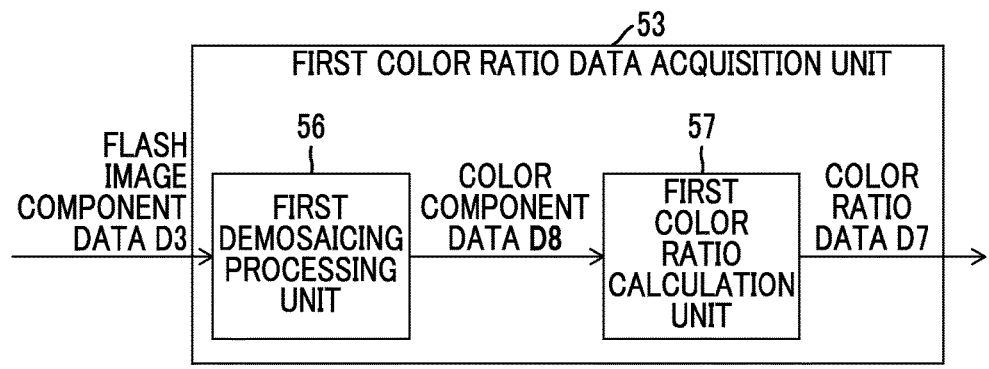
FIG. 13 is a block diagram illustrating the functional structure of a first color ratio data acquisition unit.

FIG. 13 is a block diagram illustrating the functional structure of the first color ratio data acquisition unit 53. The first color ratio data acquisition unit 53 according to this embodiment includes a first demosaicing processing unit 56 and a first color ratio calculation unit 57.

The first demosaicing processing unit 56 performs a demosaicing process (synchronization process) for the flash image component data D3. Color component data D8 obtained by allocating pixel data related to each color (for example, R, G, and B) forming the color filters 16 of the imaging element 21 to each pixel forming the flash image component data D3 is acquired by the demosaicing process.

The first color ratio calculation unit 57 acquires the color ratio data D7 of the flash image component data D3 in each of the plurality of processing blocks, on the basis of the color component data D8. The color ratio data D7 indicates a color component ratio (for example, an RGB ratio) of the color component data D8 forming the flash image component data D3 and is calculated for each processing block. The flash image component data D3 derived from the flash emission image data (first image data) D1 which is acquired by the imaging element 21 including the color filters 16 of a plurality of colors (for example, R, G, and B) includes the color component data D8 related to each of the plurality of colors (for example, R, G, and B) of the color filters 16. The first color ratio calculation unit 57 of the first color ratio data acquisition unit 53 (flash correction data acquisition unit 42) acquires the color ratio data D7 of the flash image component data D3 in each of the plurality of processing blocks, on the basis of the color component data D8.

The color ratio data D7 of the flash image component data D3 is based on the ratio of the color component data D8 of the flash image component data D3 related to each of a plurality of colors to the sum of the color component data D8 of a plurality of colors of the flash image component data D3 in each of the plurality of processing blocks. For example, a case is considered in which the flash image component data D3 includes R, G, and B color component data D8, each processing block includes a single pixel, and the first demosaicing processing unit 56 performs a demosaicing process such that each pixel of the flash image component data D3 has each of the R, G, and B color component data D8. In a case in which the ratio of the values of the R, G, and B color component data D8 in a "certain pixel" of the flash image component data D3 is, for example, "R:G:B=1:2:3", the color ratio data D7 related to this pixel is "R:G:B=1/(1+2+3):2/(1+2+3):3/(1+2+3)" and directly or indirectly indicates the color component ratio.

In the above-mentioned example, the first demosaicing processing unit 56 performs the demosaicing process for the flash image component data D3. However, the flash image component acquisition unit 40 may acquire "the flash emission image data D1 and the flash non-emission image data D2 subjected to the demosaicing process". That is, the demosaicing process may be performed for the flash emission image data D1 and the flash non-emission image data D2 before the flash emission image data D1 and the flash non-emission image data D2 are input to the flash image component acquisition unit 40. In the above-mentioned example, the first demosaicing processing unit 56 performs the demosaicing process for the flash image component data D3. However, in a case in which each processing block includes a plurality of pixels, the first demosaicing processing unit 56 (demosaicing process) may not be provided. In a case in which the first demosaicing processing unit 56 is not provided, the color ratio data D7 in each processing block can be acquired from the color component data D8 related to each of a plurality of pixels forming each processing block.

For example, in a case in which each processing block includes 2×2 pixels corresponding to the basic array pattern of the Bayer array, the data of the pixel (pixel data) represented by R in FIG. 11A may be treated as the color component data D8 of R in each processing block, the data of the pixel represented by B in FIG. 11A may be treated as the color component data D8 of B in each processing block, and the color component data D8 of G in each processing block may be acquired from the data of two pixels represented by "G" and "G2" in FIG. 11A. In a case in which each processing block includes 6×6 pixels corresponding to the basic array pattern of the X-Trans array, the color component data D8 of R in each processing block may be acquired from the data of eight pixels represented by "R1" to "R8" in FIG. 11B, the color component data D8 of B in each processing block may be acquired from the data of eight pixels represented by "B1" to "B8" in FIG. 11B, and the color component data D8 of G in each processing block may be acquired from the data of 20 pixels represented by "G1" to "G20" in FIG. 11B. A method for calculating the color component data D8 of a single color in each processing block from data of a plurality of pixels is not particularly limited. For example, the "average value" of the data of a plurality of pixels related to a single color may be set as the color component data D8 of the single color. Therefore, in the example illustrated in FIG. 11A, the average value of the data of two pixels represented by "G1" and "G2" may be set as the color component data D8 of G in each processing block. Similarly, in the example illustrated in FIG. 11B, the average value of the data of eight pixels represented by "R1" to "R8" may be set as the color component data D8 of R in each processing block, the average value of the data of eight pixels represented by "B1" to "B8" may be set as the color component data D8 of B in each processing block, and the average value of the data of 20 pixels represented by "G1" to "G20" may be set as the color component data D8 of G in each processing block.

Figure 14:
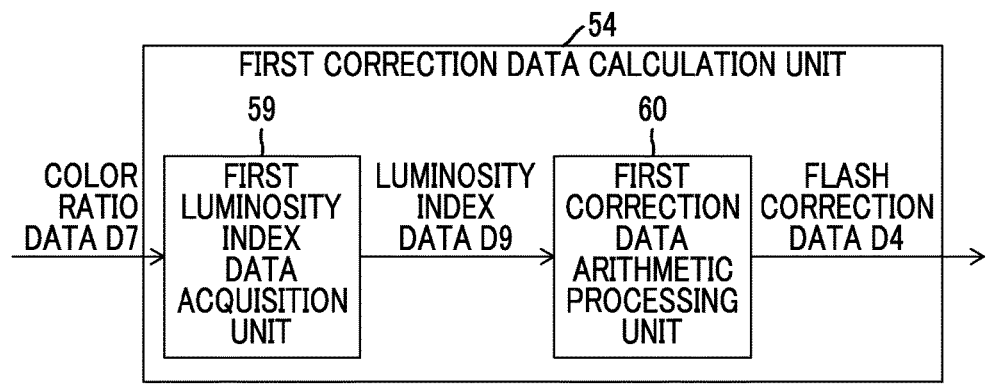
FIG. 14 is a block diagram illustrating the functional structure of a first correction data calculation unit.

FIG. 14 is a block diagram illustrating the functional structure of the first correction data calculation unit 54. The first correction data calculation unit 54 according to this embodiment includes a first luminosity index data acquisition unit 59 and a first correction data arithmetic processing unit 60.

The first luminosity index data acquisition unit 59 acquires luminosity index data D9 from the color ratio data D7. That is, the first luminosity index data acquisition unit 59 (flash correction data acquisition unit 42) acquires the luminosity index data D9 of the flash image component data D3 in each of the plurality of processing blocks from the color ratio data D7 of the flash image component data D3 in each of the plurality of processing blocks, on the basis of "arithmetic processing for deriving the luminosity index data D9 indicating the luminosity of the flash image component data D3 corresponding to the color of the object from the color ratio data D7 of the flash image component data D3.

The first correction data arithmetic processing unit 60 acquires the flash correction data D4 from the luminosity index data D9. In particular, the first correction data arithmetic processing unit 60 (flash correction data acquisition unit 42) according to this embodiment acquires the flash correction data D4 related to each of the plurality of processing blocks on the basis of the color ratio data of achromatic colors. That is, the first correction data arithmetic processing unit 60 (flash correction data acquisition unit 42) acquires the luminosity index data related to achromatic colors from the color ratio data of the achromatic colors, in which the ratio of the color component data related to each of the plurality of colors to the sum of the color component data of the plurality of colors in each of the plurality of processing blocks, on the basis of the arithmetic processing. Then, the first correction data arithmetic processing unit 60 (flash correction data acquisition unit 42) acquires the flash correction data D4 related to each of the plurality of processing blocks of the flash image component data D3, on the basis of the ratio of the luminosity index data D9 of the flash image component data D3 in each of the plurality of processing blocks to the luminosity index data related to the achromatic color.

The "arithmetic processing" used to acquire the luminosity index data D9 is not particularly limited as long as it is a process for calculating the luminosity index data D9 directly or indirectly indicating luminosity. For example, "arithmetic processing" used to calculate a "brightness value" may be used. Therefore, the luminosity index data D9 may be calculated on the basis of an expression that is used to calculate a "brightness value (Y)" and is represented by, for example, "Y=0.3*R+0.6*G+0.1*B". During the arithmetic processing using this expression, in a case in which the color ratio data D7 in "a certain processing block" of, for example, the flash image component data D3 indicates "R:G:B=1/(1+2+3):2/(1+2+3):3/(1+2+3) (=1:2:3)", for example, the luminosity index data D9 of the processing block can be set as follows: "D9=0.3*1/(1+2+3)+0.6*2/(1+2+3)+0.1*3/(1+2+3)=0.3/6+1.2/6+0.3/6=1.8/6=0.9/3". In this case, the color ratio data of achromatic colors always indicates "R:G:B=⅓:⅓:⅓ (=1:1:1)" since the color component data related to R, G, and B are the same. Therefore, the luminosity index data D9 of an achromatic color calculated by the above-mentioned expression is "D9=0.3*⅓+0.6*⅓+0.1*⅓=0.3/3+0.6/3+0.1/3=1.0/3". In this case, the flash correction data D4 calculated by the first correction data arithmetic processing unit 60 is acquired on the basis of the ratio (=(0.9/3)/(1.0/3)) of the luminosity index data D9 (=0.9/3) of the flash image component data D3 in the processing block to the luminosity index data D9 (=1.0/3) of the achromatic color. For example, the reciprocal (=1.0/0.9) of the ratio is used as the flash correction data D4. In addition, Y (brightness) in a CIE XYZ color system (color space) or L* (luminosity) in a CIE L*a*b* color system (color space) may be used as the luminosity index data D9.

The flash luminosity correction unit 44 (see FIG. 5) acquires the flash image correction component data D5 on the basis of the acquired "flash image component data D3 output from the flash image component acquisition unit 40 (first extraction data adjustment unit 49)" and the acquired "flash correction data D4 output from the flash correction data acquisition unit 42 (first correction data arithmetic processing unit 60)". A detailed method for acquiring the flash image correction component data D5 will be described in detail in the third embodiment which will be described below.

Figure 15:
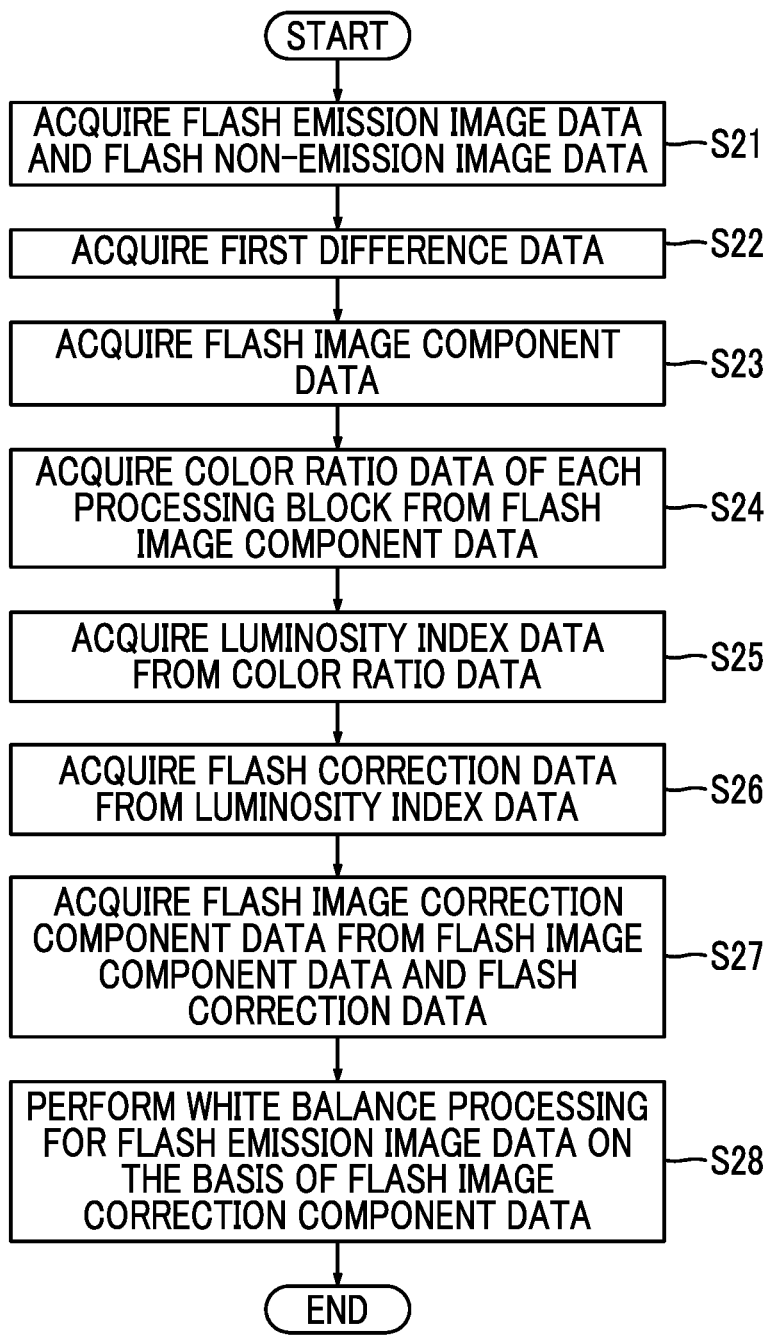
FIG. 15 is a flowchart illustrating white balance processing according to the second embodiment.

FIG. 15 is a flowchart illustrating white balance processing according to the second embodiment.

As described above, the white balance processing according to this embodiment is an aspect of the white balance processing according to the first embodiment. Therefore, Step S21 illustrated in FIG. 15 corresponds to Step S11 illustrated in FIG. 6 in the first embodiment, Steps S22 and S23 illustrated in FIG. 15 correspond to Step S12 illustrated in FIG. 6, Steps S24 to S26 illustrated in FIG. 15 correspond to Step S13 illustrated in FIG. 6, Step S27 illustrated in FIG. 15 corresponds to Step S14 illustrated in FIG. 6, and Step S28 illustrated in FIG. 15 corresponds to Step S15 illustrated in FIG. 6.

That is, in this embodiment, the first image data extraction unit 47 of the flash image component acquisition unit 40 acquires the flash emission image data D1 and the flash non-emission image data D2 (S21 in FIG. 15) and the first difference data D6 is acquired on the basis of the flash emission image data D1 and the flash non-emission image data D2 (S22).

The first extraction data adjustment unit 49 of the flash image component acquisition unit 40 applies the white balance gain WB1 for flash light to the first difference data D6 to acquire the flash image component data D3 (S23).

Then, in the first color ratio data acquisition unit 53 of the flash correction data acquisition unit 42, the first demosaicing processing unit 56 acquires the color component data D8 related to each processing block from the flash image component data D3 and the first color ratio calculation unit 57 acquires the color ratio data D7 related to each processing block from the color component data D8 (S24).

Then, in the first correction data calculation unit 54 of the flash correction data acquisition unit 42, the first luminosity index data acquisition unit 59 acquires the luminosity index data D9 related to each processing block from the color ratio data D7 (S25) and the first correction data arithmetic processing unit 60 acquires the flash correction data D4 related to each processing block from the luminosity index data D9 (S26).

Then, the flash luminosity correction unit 44 acquires the flash image correction component data D5 from the flash image component data D3 and the flash correction data D4 (S27) and the white balance processing unit 46 performs white balance processing corresponding to the flash image correction component data D5 for the flash emission image data D1 (S28).

As described above, according to the image processing device 31 and the image processing method of this embodiment, similarly to the image processing device 31 according to the first embodiment, it is possible to achieve high-accuracy white balance processing, on the basis of the flash correction data for compensating for a difference in the luminosity (brightness) of the flash image component data caused by the color of the object.

Third Embodiment

In this embodiment, the same or similar components as those in the second embodiment are denoted by the same reference numerals and the detailed description thereof will not be repeated.

An image processing device 31 according to this embodiment is an aspect of the image processing device 31 according to the second embodiment. The flash correction data D4 is applied to each processing block of data indicating the luminosity (brightness) of the flash image component data D3 to acquire the flash image correction component data D5. That is, the image processing device 31 according to this embodiment comprises a flash image component acquisition unit 40, a flash correction data acquisition unit 42, a flash luminosity correction unit 44, and a white balance processing unit 46, similarly to the image processing device 31 according to the first embodiment illustrated in FIG. 5 and the image processing device 31 according to the second embodiment. In particular, the flash luminosity correction unit 44 has the following detailed structure.

Figure 16:
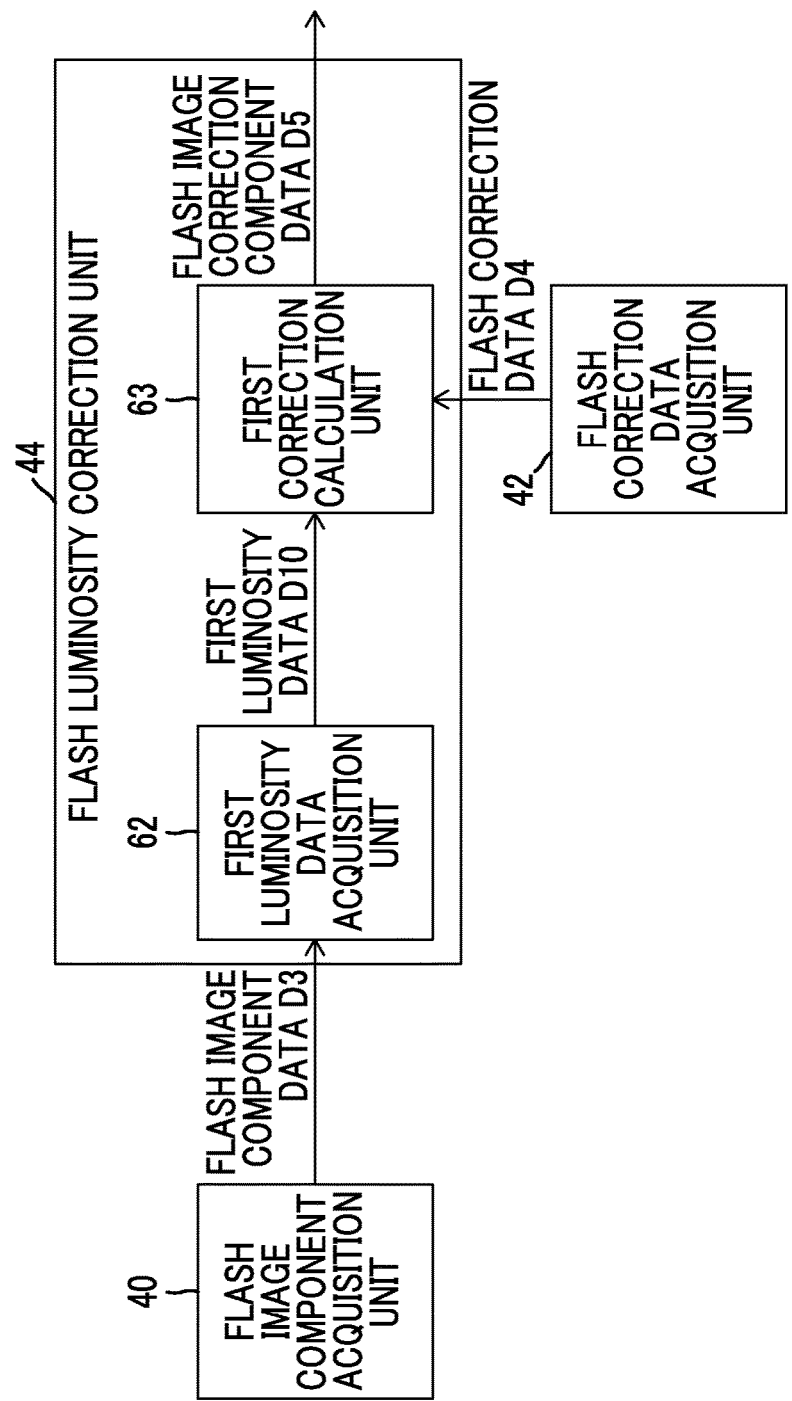
FIG. 16 is a block diagram illustrating the functional structure of a flash luminosity correction unit according to a third embodiment.

FIG. 16 is a block diagram illustrating the functional structure of the flash luminosity correction unit 44 according to the third embodiment.

The flash luminosity correction unit 44 according to the this embodiment includes a first luminosity data acquisition unit 62 and a first correction calculation unit 63.

The first luminosity data acquisition unit 62 of the flash luminosity correction unit 44 acquires first luminosity data D10 in each of a plurality of processing blocks on the basis of the flash image component data D3 transmitted from the flash image component acquisition unit 40. The first luminosity data D10 according to this embodiment is data indicating brightness. The first luminosity data (brightness flash influence map) D10 may be calculated by any method. That is, the first luminosity data acquisition unit 62 converts color component data (for example, RGB data) of the flash image component data D3 into brightness to acquire the first luminosity data D10. For example, it is possible to calculate the first luminosity data D10 (brightness value (Y)) from the flash image component data D3, using the same "arithmetic processing (for example, "Y=0.3*R+0.6*G+0.1*B")" as that used to acquire the luminosity index data D9 in the first luminosity index data acquisition unit 59 (the flash correction data acquisition unit 42 and the first correction data calculation unit 54) illustrated in FIG. 14.

The first correction calculation unit 63 of the flash luminosity correction unit 44 applies the first luminosity data D10 to the flash correction data D4 to acquire the flash image correction component data D5 for each of the plurality of processing blocks. Specifically, the flash correction data D4 acquired by the flash correction data acquisition unit 42 according to this embodiment is applied to the first luminosity data D10 indicating the luminosity of the flash image component data D3 to compensate for a difference in the luminosity of the flash image component data D3 (first luminosity data D10) caused by the color of the object. The flash correction data acquisition unit 42 acquires the flash correction data D4 for each of the plurality of processing blocks of the flash image component data D3.

For example, for each processing block, the flash correction data D4 may be multiplied by the first luminosity data D10 to calculate the flash image correction component data D5 in which a difference in luminosity caused by the color of the object has been compensated for. In this case, the flash correction data acquisition unit 42 (first correction data arithmetic processing unit 60 (see FIG. 14)) can acquire the "reciprocal of the ratio of the luminosity index data D9 of the flash image component data D3 to the luminosity index data D9 of an achromatic color" as the flash correction data D4. For example, as described above, in a case in which the luminosity index data D9 of the achromatic color is represented by "D9=1.0/3" and the luminosity index data D9 of the flash image component data D3 in a certain processing block is represented by "D9=0.9/3", the "ratio of the luminosity index data D9 of the flash image component data D3 to the luminosity index data D9 of the achromatic color" is represented by "(0.9/3)/(1.0/3)=0.9". Therefore, the flash correction data D4 can be represented by "D4=1.0/0.9". In this case, the flash image correction component data D5 is represented by a value obtained by multiplying the first luminosity data D10 by "1.0/0.9".

As such, the flash image correction component data D5 acquired by applying the flash correction data D4 to the first luminosity data D10 indicating the brightness (luminosity) of the flash image component data D3 is data in which a difference in the brightness (luminosity) of the flash image component data D3 (first luminosity data D10) caused by the color of the object has been compensated for.

Figure 17:
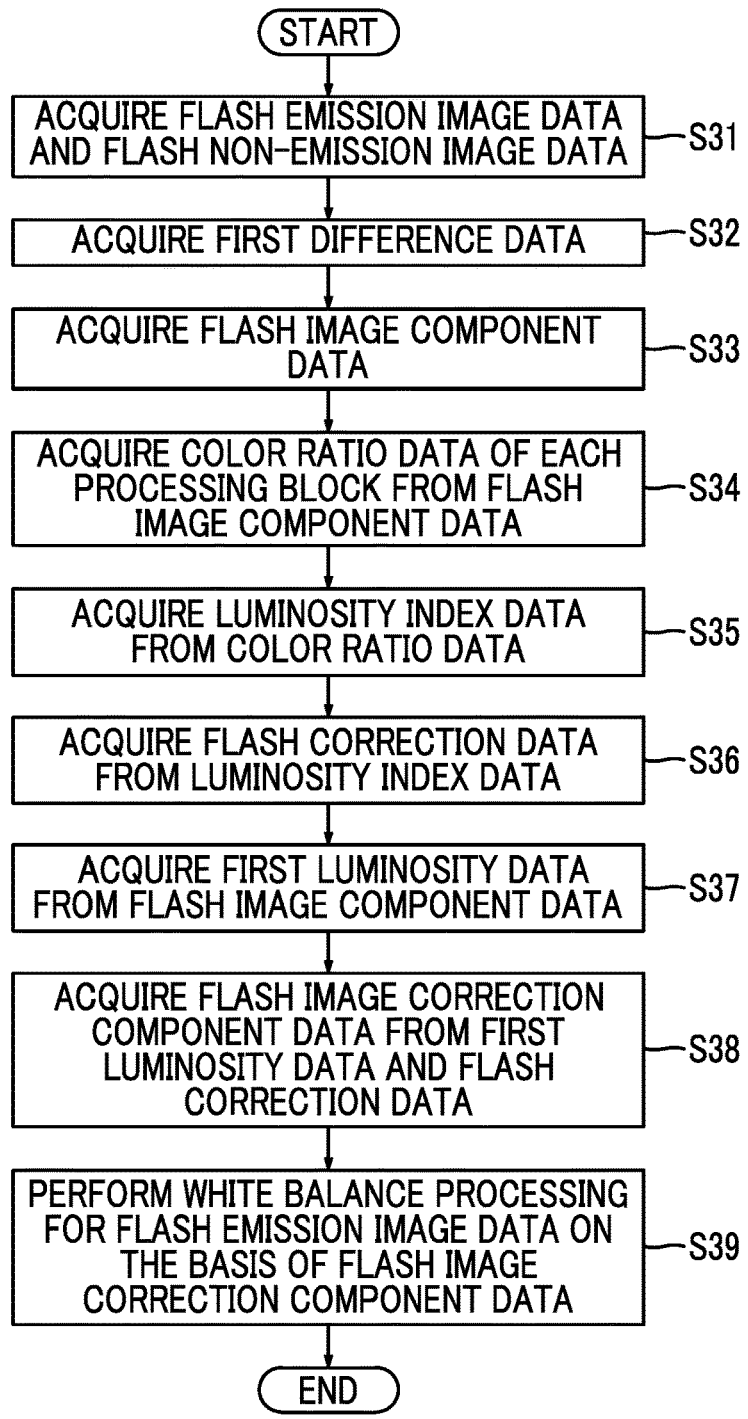
FIG. 17 is a flowchart illustrating white balance processing according to the third embodiment.

FIG. 17 is a flowchart illustrating white balance processing according to the third embodiment.

As described above, the white balance processing according to this embodiment is an aspect of the white balance processing according to the second embodiment. For example, Steps S31 to S36 illustrated in FIG. 17 correspond to Steps S21 to S26 illustrated in FIG. 15 in the second embodiment, Steps S37 and S38 illustrated in FIG. 17 correspond to Step S27 illustrated in FIG. 15, and Step S39 illustrated in FIG. 17 corresponds to Step S28 illustrated in FIG. 15.

That is, this embodiment, similarly to Steps S21 to S26 illustrated in FIG. 15, the flash emission image data D1 and the flash non-emission image data D2 are acquired (S31 in FIG. 17), the first difference data D6 is acquired (S32), the flash image component data D3 is acquired (S33), the color ratio data D7 related to each processing block is acquired (S34), the luminosity index data D9 related to each processing block is acquired (S35), and the flash correction data D4 related to each processing block is acquired (S36).

Then, the first luminosity data acquisition unit 62 of the flash luminosity correction unit 44 acquires the first luminosity data D10 related to each processing block from the flash image component data D3 acquired by the flash image component acquisition unit 40 (S37). Then, the first correction calculation unit 63 of the flash luminosity correction unit 44 acquires the flash image correction component data D5 from the first luminosity data D10 and the flash correction data D4 (S38).

Then, the white balance processing unit 46 performs white balance processing corresponding to the flash image correction component data D5 for the flash emission image data D1 (S39). For example, a "region in which the flash image correction component data D5 has a value that is equal to or greater than 50% of the maximum gradation value (maximum image data value)" may be determined to be a flash region. The white balance processing unit 46 applies the white balance gain WB1 for flash light to the flash region of the flash emission image data D1 to perform white balance processing.

As described above, according to the image processing device 31 and the image processing method of this embodiment, the flash image correction component data D5 is acquired on the basis of the flash correction data for compensating for a difference in the luminosity (brightness) of the flash image component data caused by the color of the object. The use of the flash image correction component data D5 makes it possible to achieve high-accuracy white balance processing.

Fourth Embodiment

In this embodiment, the same or similar components as those in the third embodiment are denoted by the same reference numerals and the detailed description thereof will not be repeated.

The first to third embodiments mainly relate to the adjustment of the white balance of flash light. However, this embodiment relates to the adjustment of the white balance of environmental light in addition to flash light. That is, an image processing device 31 according to this embodiment performs not only a process of correcting each color of flash light but also a process of correcting each color of environmental light in the flash emission image data D1.

In general, in a case in which a light source used to capture image data is unclear, when a gray (achromatic) object is not included in an image or when the region (position) of an achromatic object included in an image is unclear, it is difficult to acquire an appropriate white balance gain.

However, for example, according to the image processing of the image processing device 31 of the second and third embodiments, it is possible to acquire the flash image component data D3 (see FIG. 9) subjected to white balance processing for cancelling the influence of flash light used during imaging. The flash image component data D3 indicates the original color component ratio of the object irradiated with flash light. Therefore, when the flash image component data D3 is used as a reference (target), it is possible to acquire an appropriate white balance gain related to environmental light, regardless of whether the original color of the object is an achromatic color in an image region affected by flash light.

When a white balance gain for environmental light can be acquired, "data indicating the influence of environmental light (environmental light image correction component data which will be described below)" in which a difference in luminosity caused by the color of an object has been compensated for can be acquired by the same process as that in the image processing device 31 according to the second and third embodiments. The ratio of the influence of environmental light to the influence of flash light can be calculated for each processing block of the flash emission image data D1 by a combination of the data indicating the influence of environmental light (environmental light image correction component data) and the flash image correction component data D5 acquired in the second and third embodiments. When white balance processing for flash light and/or white balance processing for environmental light is performed using "the ratio of the influence of environmental light to the influence of flash light for each processing block of the flash emission image data D1", it is possible to perform high-accuracy white balance processing.

Next, an example of the detailed functional structure of the fourth embodiment will be described.

Figure 18:
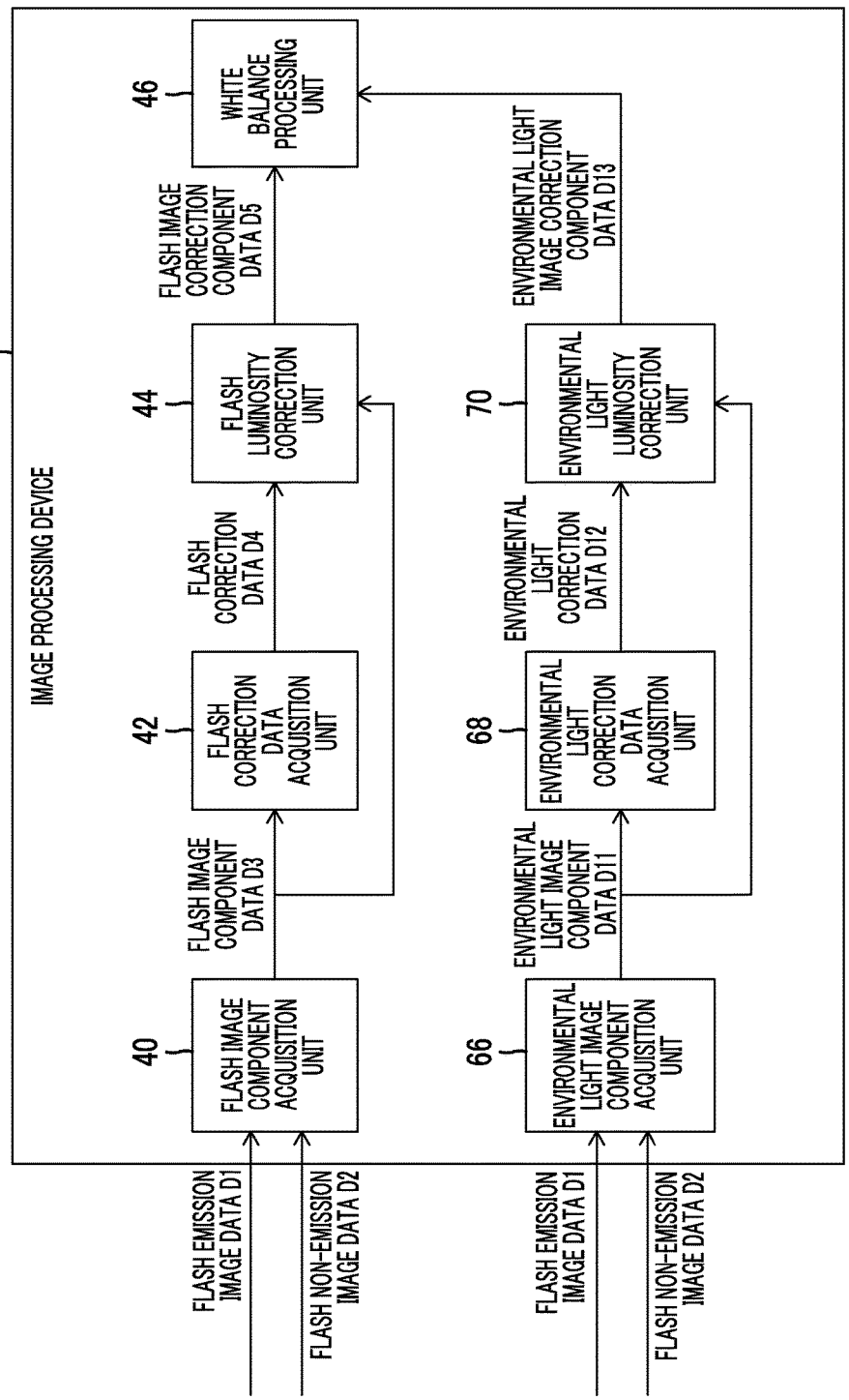
FIG. 18 is a block diagram illustrating the functional structure of an image processing device according to a fourth embodiment.

FIG. 18 is a block diagram illustrating the functional structure of the image processing device 31 according to the fourth embodiment. The image processing device 31 according to this embodiment comprises an environmental light image component acquisition unit 66, an environmental light correction data acquisition unit 68, and an environmental light luminosity correction unit 70, in addition to the flash image component acquisition unit 40, the flash correction data acquisition unit 42, the flash luminosity correction unit 44, and the white balance processing unit 46.

The flash image component acquisition unit 40, the flash correction data acquisition unit 42, and the flash luminosity correction unit 44 have the same functional structure as those in the third embodiment.

The environmental light image component acquisition unit 66 acquires environmental light image component data D11 indicating an environmental light image component of an object, using second image data (flash non-emission image data D2) acquired by capturing an image of the object, without emitting flash light, as basic data. Here, the basic data is data that is used as a basis in a case in which the environmental light image component data D11 is acquired and is not particularly limited as long as the environmental light image component data D11 indicating an environmental light image component of the object can be derived. For example, the environmental light image component acquisition unit 66 may use the "second image data (flash non-emission image data D2)" as the basic data or may use, as the basic data, second difference data indicating the difference between the "first image data (flash emission image data D1)" and "first difference data indicating the difference between the first image data and the second image data (flash non-emission image data D2)". The environmental light image component acquisition unit 66 can derive the environmental light image component data D11 on the basis of the basic data (for example, the "second image data" or the "second difference data").

Figure 19:
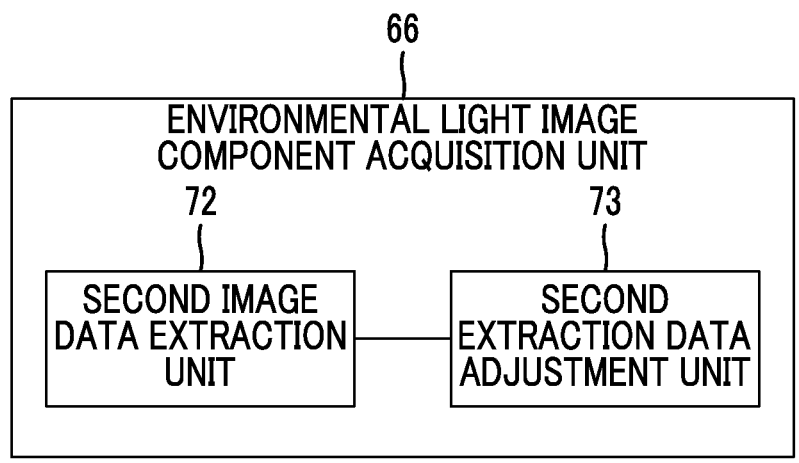
FIG. 19 is a block diagram illustrating the functional structure of an environmental light image component acquisition unit according to the fourth embodiment.

FIG. 19 is a block diagram illustrating the functional structure of the environmental light image component acquisition unit 66 according to the fourth embodiment. The environmental light image component acquisition unit 66 according to this embodiment includes a second image data extraction unit 72 and a second extraction data adjustment unit 73.

The second image data extraction unit 72 according to this embodiment is a processing unit that acquires basic data D14 of the environmental light image component data indicating the environmental light image component of the object. Specifically, for example, the "flash non-emission image data D2 that is affected by only environmental light" acquired by capturing an image of an object without emitting flash light can be used as the "basic data D14 of the environmental light image component data". However, a method for acquiring the basic data D14 of the environmental light image component data is not limited thereto.

Figure 20:
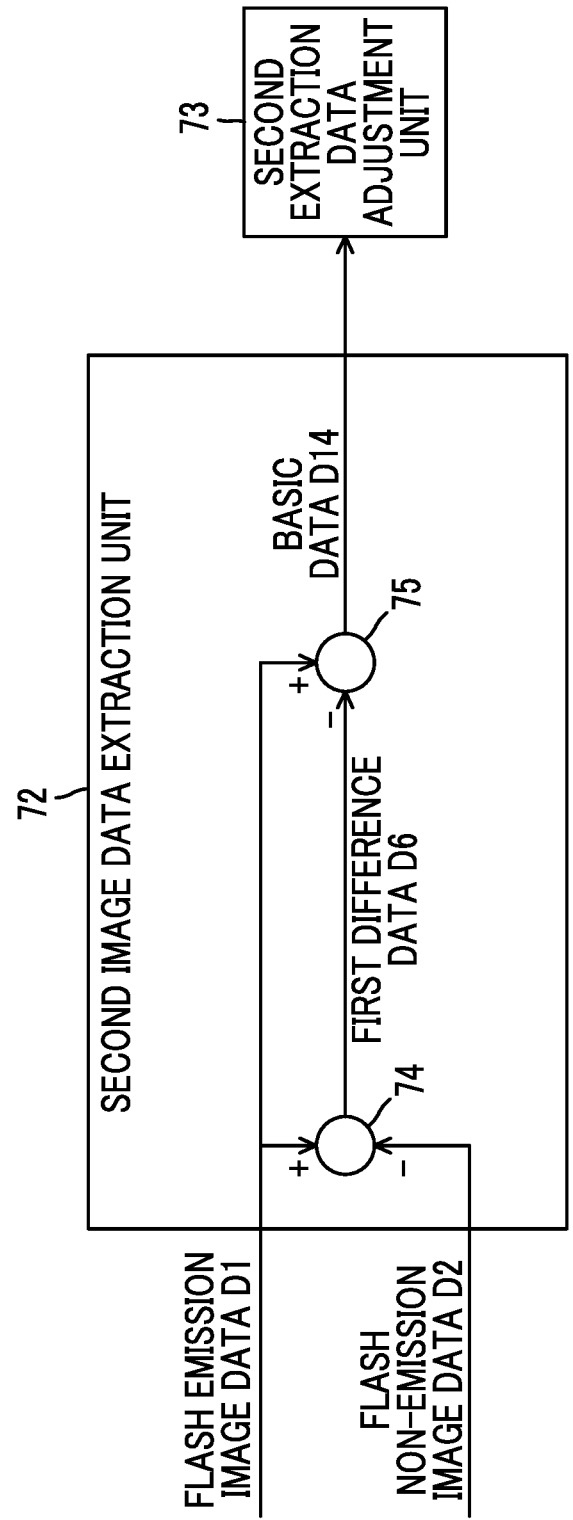
FIG. 20 is a block diagram illustrating an example of the structure of a second image data extraction unit of the environmental light image component acquisition unit.

For example, the second image data extraction unit 72 of the environmental light image component acquisition unit 66 can use the second difference data indicating the difference between the "flash emission image data (first image data) D1" and the "first difference data D6 indicating the difference between the flash emission image data D1 and the flash non-emission image data D2 (second image data) acquired by capturing an image of an object without emitting flash light" as the "basic data D14 of the environmental light image component data". FIG. 20 is a block diagram illustrating an example of the structure of the second image data extraction unit 72 of the environmental light image component acquisition unit 66. The second image data extraction unit 72 according to this embodiment includes a first subtracter 74 and a second subtracter 75. The first subtracter 74 receives the flash emission image data D1 and the flash non-emission image data D2 and calculates the first difference data D6 represented by "the first difference data D6=the flash emission image data D1−the flash non-emission image data D2". The second subtracter 75 receives the flash emission image data D1 and the first difference data D6 and calculates the basic data D14 represented by "the basic data (first RGB background influence map) D14=the second difference data=the flash emission image data D1−the first difference data D6". The basic data D14 calculated by the second subtracter 75 is transmitted from the second image data extraction unit 72 to the second extraction data adjustment unit 73.

Figure 21:
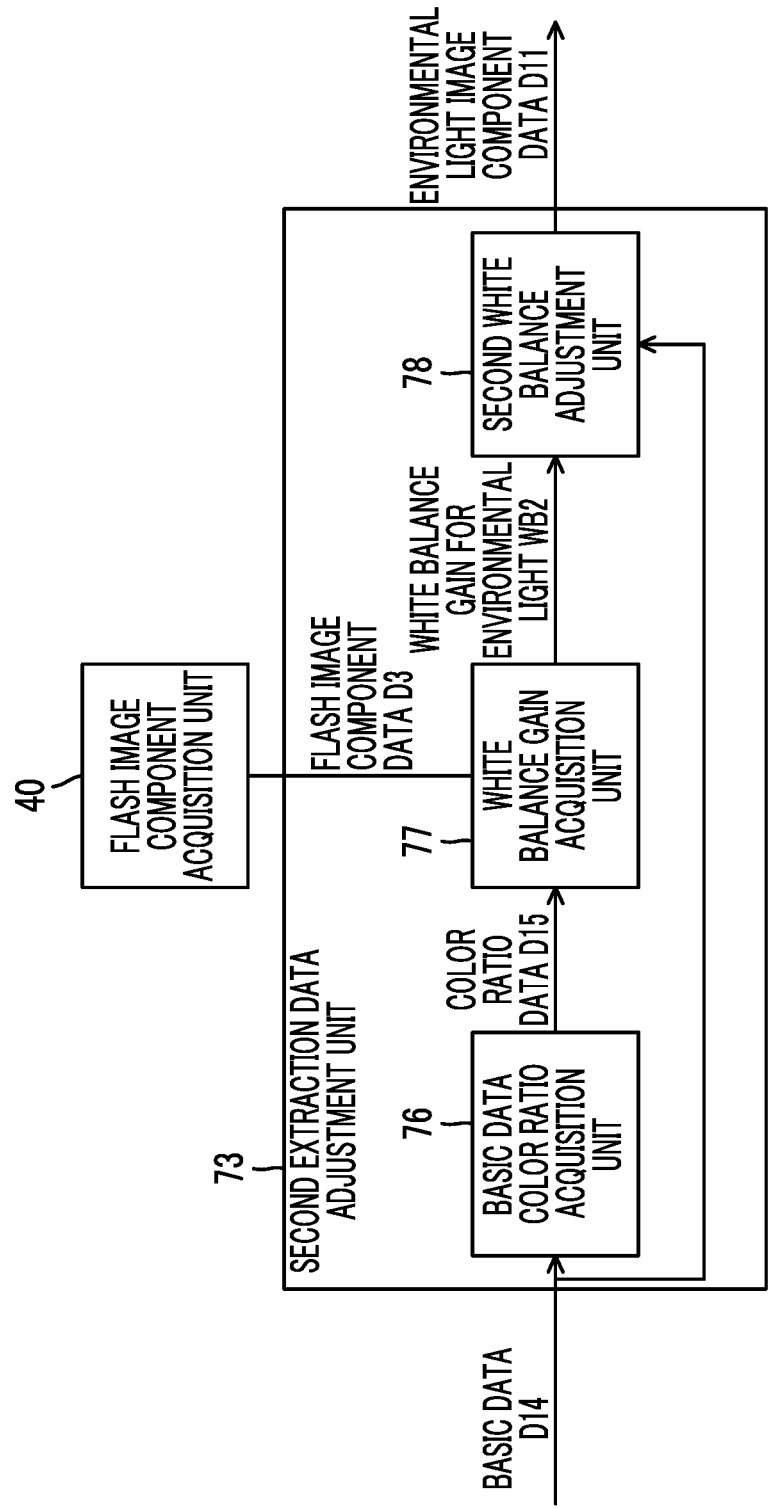
FIG. 21 is a block diagram illustrating an example of the structure of a second extraction data adjustment unit of the environmental light image component acquisition unit.

FIG. 21 is a block diagram illustrating an example of the structure of the second extraction data adjustment unit 73 of the environmental light image component acquisition unit 66. The second extraction data adjustment unit 73 according to this embodiment includes a basic data color ratio acquisition unit 76, a white balance gain acquisition unit 77, and a second white balance adjustment unit 78.

The basic data color ratio acquisition unit 76 (environmental light image component acquisition unit 66) acquires color ratio data D15 indicating a color component ratio of the basic data D14 in each of a plurality of processing blocks.

The white balance gain acquisition unit 77 (environmental light image component acquisition unit 66) acquires a white balance gain WB2 for environmental light on the basis of the color ratio data D7 of the flash image component data D3 in each of the plurality of processing blocks and the color ratio data D15 of the basic data D14. In the example illustrated in FIG. 21, the white balance gain acquisition unit 77 acquires the flash image component data D3 from the flash image component acquisition unit 40 and performs the same process as the first color ratio data acquisition unit 53 (see FIG. 12) to acquire the color ratio data D7 of the flash image component data D3 in each of the plurality of processing blocks. However, the white balance gain acquisition unit 77 may acquire the color ratio data D7 of the flash image component data D3 from the first color ratio data acquisition unit 53 of the flash correction data acquisition unit 42.

The flash image component data D3 is data to which the white balance gain WB1 for flash light has been applied to reproduce the original color of the object. The "original color of the object" is the same in a case in which an image of an object is captured while flash light is emitted and a case in which an image of an object is captured while only environmental light is emitted. Therefore, the white balance gain acquisition unit 77 acquires the white balance gain WB2 for environmental light such that data obtained by applying the white balance gain WB2 for environmental light to the color ratio data D15 of the basic data D114 is the same as the color ratio data D7 of the flash image component data D3 in the same processing block.

Data of "a processing block that is not affected by flash light and is affected by only environmental light" among a plurality of processing blocks forming the flash image component data D3 is not the data in which "the original color of the object" has been reproduced. Therefore, when acquiring the white balance gain WB2 for environmental light, the white balance gain acquisition unit 77 acquires the white balance gain WB2 for environmental light using the data of "the processing block that is affected by flash light", without using the data of "the processing block that is affected by only environmental light" in the color ratio data D7 of the flash image component data D3.

As such, when the white balance gain WB2 for environmental light acquired by setting the color ratio data D7 of the flash image component data D3 indicating the "original color of the object" as target data is applied to the color ratio data D15 of the basic data D14 in each of the plurality of processing blocks, the color ratio data of the environmental light image component data D11 in each of the plurality of processing blocks is derived. Therefore, the second white balance adjustment unit 78 (environmental light image component acquisition unit 66) applies the white balance gain WB2 for environmental light to the basic data D14 to acquire the environmental light image component data (second RGB background influence map) D11.

In some cases, the environmental light image component data D11 varies slightly depending on objects. Therefore, the average value of the sum of the white balance gains WB2 for environmental light acquired for a plurality of processing blocks may be used as the white balance gain WB2 for environmental light which is applied to the basic data D14 related to each processing block. However, for example, the white balance gain WB2 for environmental light derived from each processing block (each pixel) is applied to the basic data D14 of the corresponding processing block in order to improve image quality in a case in which environmental light is not generated by a single light source, but is generated by a mixture of a plurality of light sources or a case in which a moving body is included in the object. Therefore, it is not necessary to collectively apply the same white balance gain WB2 for environmental light to all of the processing blocks of the basic data D14.

The calculated environmental light image component data D11 is "captured image data indicating the influence of environmental light" which is not affected by flash light.

The environmental light image component acquisition unit 66 (second image data extraction unit 72) may acquire the first difference data D6 and the basic data D14 using the flash emission image data, without using the flash non-emission image data D2. That is, the environmental light image component acquisition unit 66 may derive the basic data D14 on the basis of the "first image data (flash emission image data D1) acquired by capturing an image of an object while a first amount of flash light is emitted" and the "first difference data D6 indicating the difference between the first image data and the second image data (flash emission image data) acquired by capturing an image of the object while a second amount of flash light different from the first amount of flash light is emitted" and may acquire the environmental light image component data D11 on the basis of the basic data D14.

FIG. 22 is a block diagram illustrating the functional structure of the environmental light correction data acquisition unit 68.

The environmental light correction data acquisition unit 68 includes a second color ratio data acquisition unit 80 and a second correction data calculation unit 81 and acquires environmental light correction data (environmental light influence map for each color) D12, in which a difference in the luminosity of the environmental light image component data D1 caused by the color of the object has been reflected, on the basis of the environmental light image component data D11. That is, the second color ratio data acquisition unit 80 acquires color ratio data D16 indicating a color component ratio of the environmental light image component data D11 in each of the plurality of processing blocks from the environmental light image component data D11. The second correction data calculation unit 81 acquires the environmental light correction data D12, in which a difference in luminosity between the plurality of processing blocks of the environmental light image component data D11 caused by the color of the object has been reflected, on the basis of the color ratio data D16 of the environmental light image component data D11.

The environmental light correction data acquisition unit 68 according to this embodiment acquires luminosity index data (brightness data) from color ratio data (for example, an RGB ratio) of the environmental light image component data D11 acquired for each processing block and acquires the environmental light correction data D12 (correction gain) for compensating for a difference in luminosity (brightness) between colors from the luminosity index data, in order to reduce an influence which depends on the color based on the spectral characteristics (spectral reflectivity) of the object.

FIG. 23 is a block diagram illustrating the functional structure of the second color ratio data acquisition unit 80.

The second color ratio data acquisition unit 80 according to this embodiment includes a second demosaicing processing unit 82 and a second color ratio calculation unit 83.

The second demosaicing processing unit 82 performs a demosaicing process for the environmental light image component data D11. Color component data D17 obtained by allocating pixel data related to each of the colors (for example, R, G, and B) forming the color filters 16 of the imaging element 21 to each pixel forming the environmental light image component data D11 is acquired by the demosaicing process. The second color ratio calculation unit 83 acquires the color ratio data D16 of the environmental light image component data D11 in each of a plurality of processing blocks on the basis of the color component data D17. The color ratio data D16 indicates the ratio (for example, an RGB ratio) of the color component data D17 forming the environmental light image component data D11 and is calculated for each processing block.

The environmental light image component data D11 includes color component data related to each of the plurality of colors (for example, R, G, and B) forming the color filters 16 of the imaging element 21. The second color ratio data acquisition unit 80 (environmental light correction data acquisition unit 68) acquires the color ratio data D16 of the environmental light image component data D11 in each of the plurality of processing blocks on the basis of the color component data.

The color ratio data D16 of the environmental light image component data D11 is based on the ratio of the color component data D17 of the environmental light image component data D11 related to each of the plurality of colors to the sum of the color component data D17 of a plurality of colors of the environmental light image component data D11 in each of the plurality of processing blocks.

In the above-mentioned example, the second demosaicing processing unit 82 performs a demosaicing process for the environmental light image component data D11. However, in a case in which the processing block includes a plurality of pixels, the second demosaicing processing unit 82 (demosaicing process) may not be provided. In a case in which the second demosaicing processing unit 82 is not provided, the color ratio data D16 in each processing block can be acquired from the color component data D17 related to each of a plurality of pixels included in each processing block. A method for calculating the color component data D17 of a single color in each processing block from the data of a plurality of pixels as described above is not particularly limited. For example, the "average value" of the data of a plurality of pixels related to a single color may be set as the color component data D17 of a single color.

FIG. 24 is a block diagram illustrating the functional structure of the second correction data calculation unit 81. The second correction data calculation unit 81 according to this embodiment includes a second luminosity index data acquisition unit 84 and a second correction data arithmetic processing unit 85.

The second luminosity index data acquisition unit 84 acquires luminosity index data D18 from the color ratio data D16. That is, the second luminosity index data acquisition unit 84 (environmental light correction data acquisition unit 68) acquires the luminosity index data D18 of the environmental light image component data D11 in each of the plurality of processing blocks from the color ratio data D16 of the environmental light image component data D11 in each of the plurality of processing blocks, on the basis of "arithmetic processing for deriving the luminosity index data D18 indicating the luminosity of the environmental light image component data D11 corresponding to the color of the object from the color ratio data D16 of the environmental light image component data D11.

The second correction data arithmetic processing unit 85 acquires the environmental light correction data D12 from the luminosity index data D18. In particular, the second correction data arithmetic processing unit 85 (environmental light correction data acquisition unit 68) according to this embodiment acquires the environmental light correction data D12 related to each of the plurality of processing blocks on the basis of the color ratio data of achromatic colors. That is, the second correction data arithmetic processing unit 85 (environmental light correction data acquisition unit 68) acquires the luminosity index data related to achromatic colors from the color ratio data of the achromatic colors, in which the ratio of the color component data related to each of a plurality of colors to the sum of the color component data of the plurality of colors in each of the plurality of processing blocks, on the basis of the arithmetic processing. Then, the second correction data arithmetic processing unit 85 (environmental light correction data acquisition unit 68) acquires the environmental light correction data D12 related to each of the plurality of processing blocks of the environmental light image component data D11, on the basis of the ratio of the luminosity index data D18 of the environmental light image component data D11 in each of the plurality of processing blocks to the luminosity index data related to the achromatic color.

Here, the "arithmetic processing" used to acquire the luminosity index data D18 is not particularly limited as long as it is a process for calculating the luminosity index data D18 directly or indirectly indicating luminosity. For example, "arithmetic processing" used to calculate a "brightness value" may be used. Therefore, the luminosity index data D18 may be calculated on the basis of an expression that is used to calculate a "brightness value (Y)" and is represented by, for example, "Y=0.3*R+0.6*G+0.1*B". In this case, the environmental light correction data D12 calculated by the second correction data arithmetic processing unit 85 is acquired on the basis of the ratio of the luminosity index data D18 of the environmental light image component data D11 in each processing block to the luminosity index data D18 of the achromatic color.

The environmental light luminosity correction unit 70 illustrated in FIG. 18 acquires environmental light image correction component data (composite environmental light influence map) D13 in which a difference in the luminosity of the environmental light image component data D11 caused by the color of the object, on the basis of the acquired "environmental light image component data D11 output from the environmental light image component acquisition unit 66 (second image data extraction unit 72)" and the acquired "environmental light correction data D12 output from the environmental light correction data acquisition unit 68 (second correction data arithmetic processing unit 85)".

Figure 25:
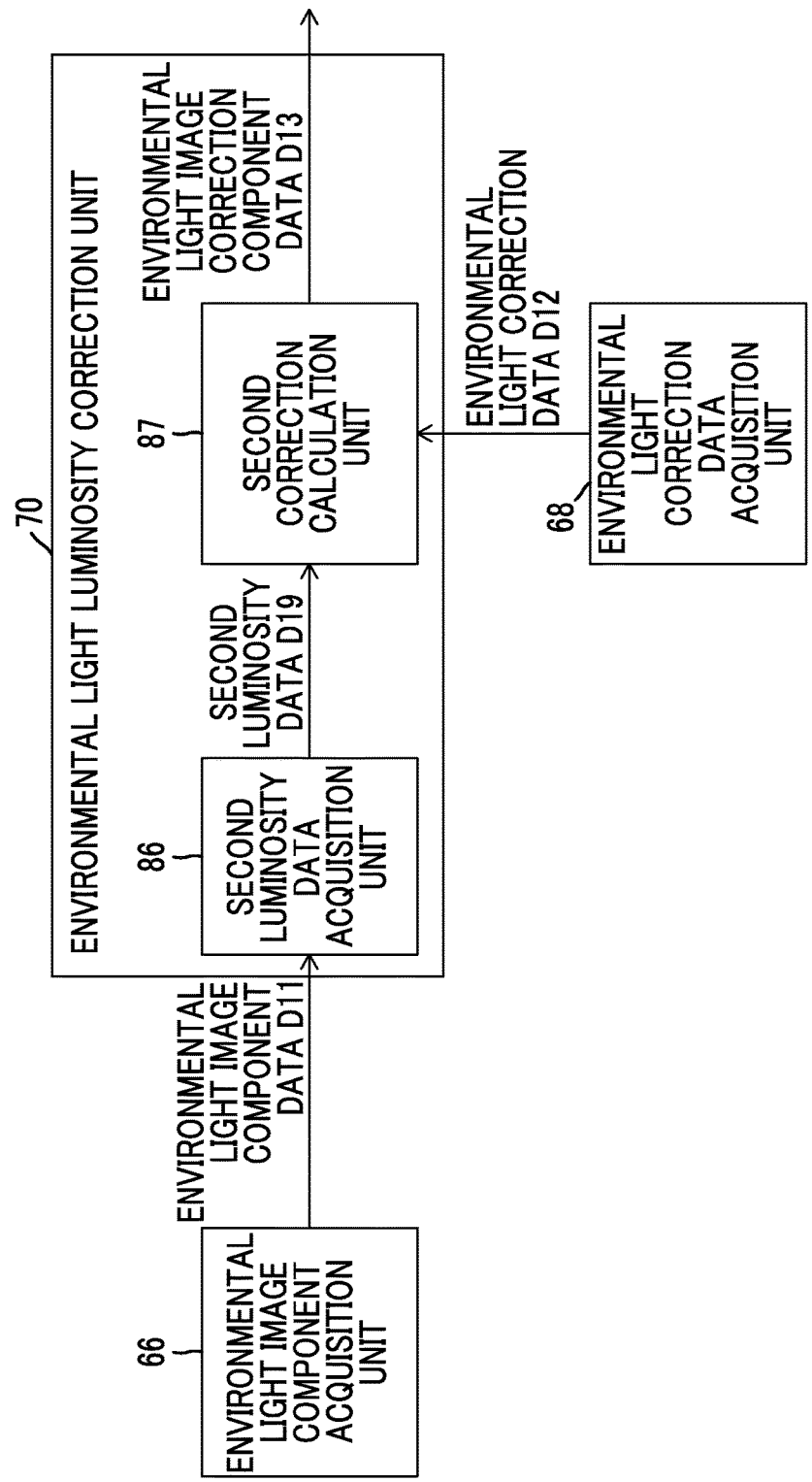
FIG. 25 is a block diagram illustrating the functional structure of an environmental light luminosity correction unit.

FIG. 25 is a block diagram illustrating the functional structure of the environmental light luminosity correction unit 70.

The environmental light luminosity correction unit 70 according to this embodiment includes a second luminosity data acquisition unit 86 and a second correction calculation unit 87.

The second luminosity data acquisition unit 86 of the environmental light luminosity correction unit 70 acquires second luminosity data (brightness environmental light influence map) D19 in each of the plurality of processing blocks on the basis of the environmental light image component data D11. The second luminosity data D19 according to this embodiment is data indicating brightness. The second luminosity data D19 may be calculated by any method. That is, the second luminosity data acquisition unit 86 converts color component data (for example, RGB data) of the environmental light image component data D11 into brightness to acquire the second luminosity data D19. For example, it is possible to calculate the second luminosity data D19 (brightness value (Y)) from the environmental light image component data D11, using the same "arithmetic processing" as that used to acquire the luminosity index data D18 in the second luminosity index data acquisition unit 84 (the environmental light correction data acquisition unit 68 and the second correction data calculation unit 81).

The second correction calculation unit 87 of the environmental light luminosity correction unit 70 applies the environmental light correction data D12 to the second luminosity data D19 to acquire the environmental light image correction component data D13 for each of the plurality of processing blocks. Specifically, the environmental light correction data D12 acquired by the environmental light correction data acquisition unit 68 according to this embodiment is applied to the second luminosity data D19 indicating the luminosity of the environmental light image component data D11 to compensate for a difference in the luminosity of the environmental light image component data D11 caused by the color of the object. The environmental light correction data acquisition unit 68 acquires the environmental light correction data D12 for each of the plurality of processing blocks of the environmental light image component data D11.

Therefore, for example, for each processing block, the environmental light correction data D12 may be multiplied by the second luminosity data D19 to calculate the environmental light image correction component data D13 in which a difference in luminosity caused by the color of the object has been compensated for. In this case, the environmental light correction data acquisition unit 68 (second correction data arithmetic processing unit 85 (see FIG. 24)) can acquire the "reciprocal of the ratio of the luminosity index data D18 of the environmental light image component data D11 to the luminosity index data D18 of an achromatic color" as the environmental light correction data D12.

As such, the environmental light image correction component data D13 acquired by applying the environmental light correction data D12 to the second luminosity data D19 indicating the brightness (luminosity) of the environmental light image component data D11 is data in which a difference in the brightness (luminosity) of the environmental light image component data D11 caused by the color of the object has been compensated for.

Then, the white balance processing unit 46 according to this embodiment illustrated in FIG. 18 adjusts the white balance of the flash emission image data (first image data) D1 on the basis of the flash image correction component data D5 and the environmental light image correction component data D13. That is, the white balance processing unit 46 applies the white balance gain WB1 for flash light and the white balance gain WB2 for environmental light to the flash emission image data (first image data) D1 on the basis of the flash image correction component data D5 and the environmental light image correction component data D13.

Figure 26:
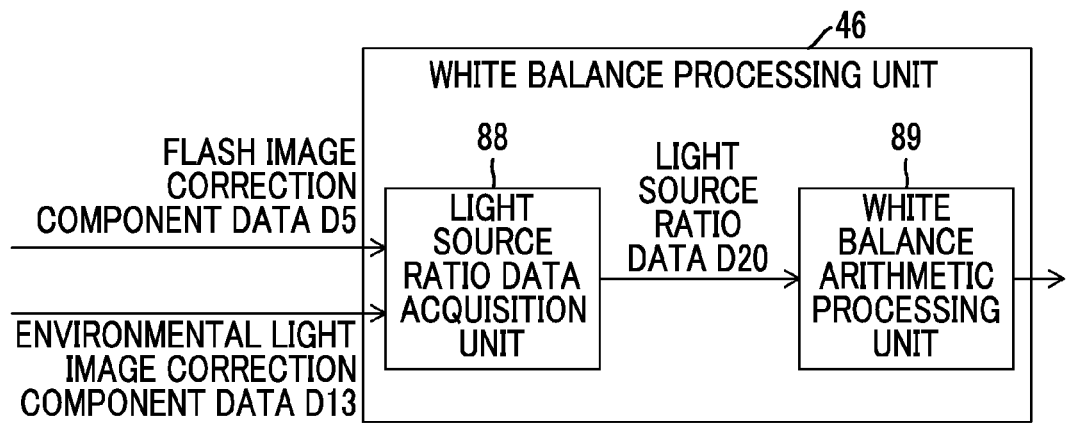
FIG. 26 is a block diagram illustrating the functional structure of a white balance processing unit according to the fourth embodiment.

FIG. 26 is a block diagram illustrating the functional structure of the white balance processing unit 46 according to the fourth embodiment.

The white balance processing unit 46 according to this embodiment includes a light source ratio data acquisition unit 88 and a white balance arithmetic processing unit 89. The light source ratio data acquisition unit 88 acquires light source ratio data (total flash influence map) D20 indicating the ratio of flash light to environmental light for each processing block from the flash image correction component data D5 and the environmental light image correction component data D13.

The white balance arithmetic processing unit 89 performs white balance processing for the flash emission image data D1 while changing the application ratio of the white balance gain WB1 for flash light to the white balance gain WB2 for environmental light for each processing block on the basis of the light source ratio data D20.

A method for acquiring the flash emission image data D1, the white balance gain WB1 for flash light, and the white balance gain WB2 for environmental light in the white balance arithmetic processing unit 89 (white balance processing unit 46) is not particularly limited. For example, the white balance arithmetic processing unit 89 may acquire the flash emission image data D1 from the flash image component acquisition unit 40 or the environmental light image component acquisition unit 66. In addition, the white balance arithmetic processing unit 89 may acquire the white balance gain WB1 for flash light from the flash light WB gain storage unit 51 (see FIG. 9). Furthermore, the white balance arithmetic processing unit 89 may acquire the white balance gain WB2 for environmental light from the white balance gain acquisition unit 77 (see FIG. 21).

A detailed white balance processing method performed in the white balance arithmetic processing unit 89 is not particularly limited. Both the white balance gain WB1 for flash light and the white balance gain WB2 for environmental light may be applied to the flash emission image data D1 for each processing block. For example, in a case in which the influence ratio of flash light to environmental light in a "certain processing block" of the flash emission image data D1 is "flash light:environmental light=2:1", the application ratio of the white balance gains to the flash emission image data D1 in the processing block may be "the white balance gain WB1 for flash light:the white balance gain WB2 for environmental light=2/(2+1): 1/(2+1)". Alternatively, for example, in a case in which the influence of flash light is more than the influence of environmental light in a "certain processing block" of the flash emission image data D1, the white balance gain WB1 for flash light may be applied to the processing block. In contrast, in a case in which the influence of environmental light is more than the influence of flash light, the white balance gain WB2 for environmental light may be applied to the processing block.

As such, white balance processing in which flash light is a light source and white balance processing in which environmental light is a light source are performed according to the ratio of the amount of influence of flash light to the amount of influence of environmental light in each processing block of the flash emission image data D1. Therefore, it is possible to perform appropriate white balance processing for an "image portion that is relatively greatly affected by flash light" and an "image portion that is relatively greatly affected by environmental light" in the flash emission image data D1.

Figure 27:
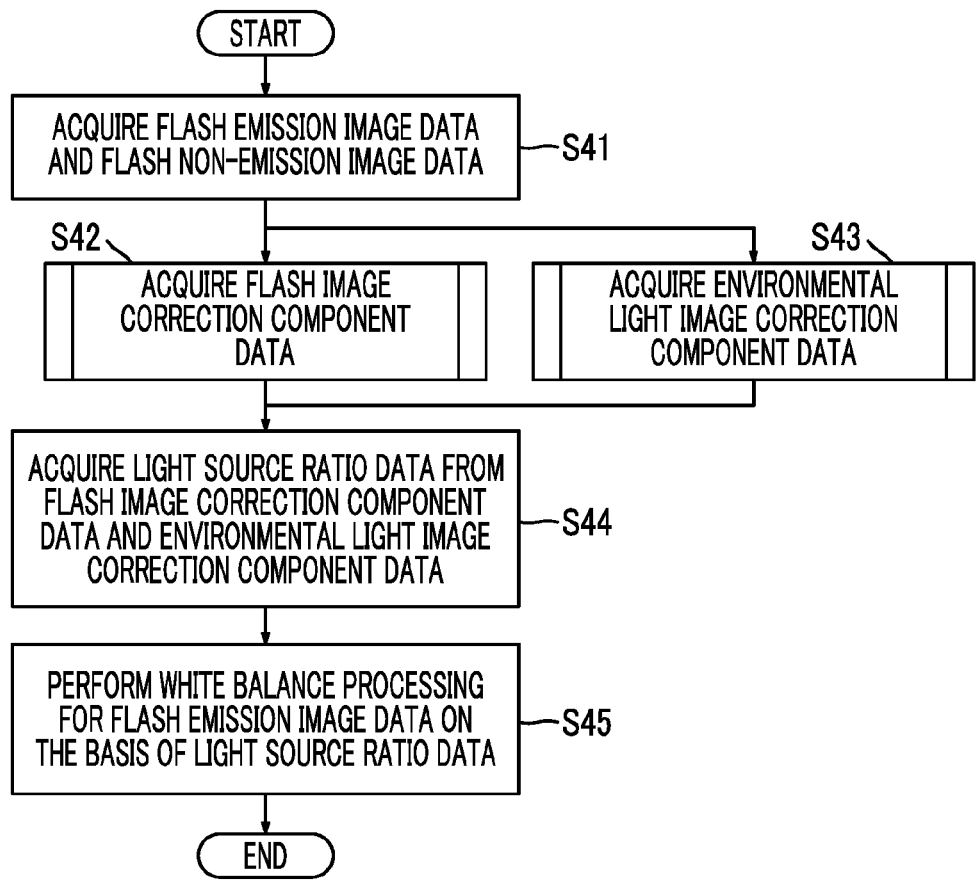
FIG. 27 is a flowchart illustrating white balance processing according to the fourth embodiment.

FIG. 27 is a flowchart illustrating white balance processing according to the fourth embodiment.

First, the flash image component acquisition unit 40 and the environmental light image component acquisition unit 66 acquire the flash emission image data D1 and the flash non-emission image data D2, respectively (S41 in FIG. 27). Then, the flash image component acquisition unit 40, the flash correction data acquisition unit 42, and the flash luminosity correction unit 44 acquire the flash image correction component data D5 on the basis of the flash emission image data D1 and the flash non-emission image data D2 (S42). The environmental light image component acquisition unit 66, the environmental light correction data acquisition unit 68, and the environmental light luminosity correction unit 70 acquire the environmental light image correction component data D13 on the basis of the flash emission image data D1 and the flash non-emission image data D2 (S43).

A process in Step S42 which acquires the flash image correction component data D5 will be described below with reference to FIG. 28. A process in Step S43 which acquires the environmental light image correction component data D13 will be described below with reference to FIG. 29.

Then, the light source ratio data acquisition unit 88 of the white balance processing unit 46 acquires the light source ratio data D20 on the basis of the flash image correction component data D5 and the environmental light image correction component data D13 (S44).

Then, the white balance arithmetic processing unit 89 of the white balance processing unit 46 performs white balance processing corresponding to the light source ratio data D20 for the flash emission image data D1 (S45). For example, the white balance gain WB1 for flash light and the white balance gain WB2 for environmental light corresponding to the light source ratio data D20 are applied to the flash emission image data D1.

Figure 28:
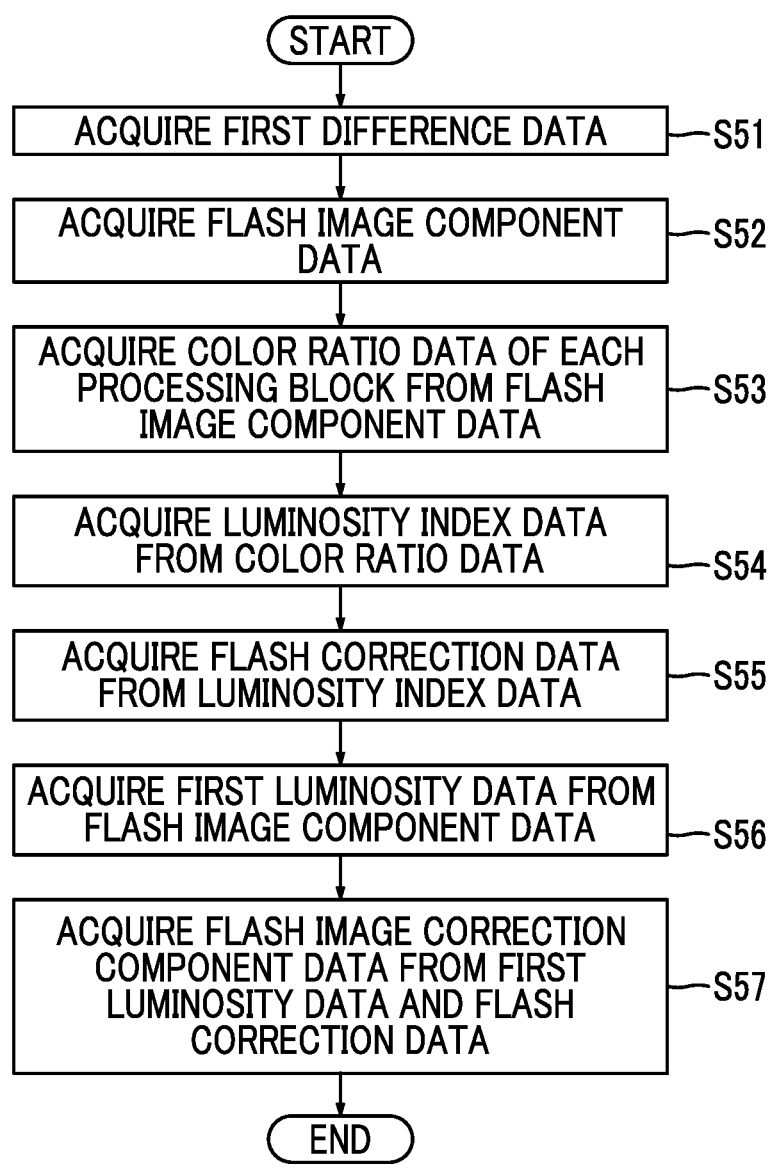
FIG. 28 is a flowchart illustrating in detail the flow of a process (Step S42 in FIG. 27) for acquiring flash image correction component data in the fourth embodiment.

FIG. 28 is a flowchart illustrating in detail the flow of a process (Step S42 in FIG. 27) for acquiring the flash image correction component data D5 in the fourth embodiment. Steps S51 to S57 illustrated in FIG. 28 are the same as Steps S32 to S38 illustrated in FIG. 17 in the third embodiment, respectively.

That is, the first image data extraction unit 47 (see FIG. 7) of the flash image component acquisition unit 40 acquires the first difference data D6 from the flash emission image data D1 and the flash non-emission image data D2 (S51 in FIG. 28) and the first extraction data adjustment unit 49 acquires the flash image component data D3 (S52).

Then, the first color ratio data acquisition unit 53 (see FIG. 12) of the flash correction data acquisition unit 42 acquires the color ratio data D7 related to each processing block from the flash image component data D3 (S53). Then, the first luminosity index data acquisition unit 59 (see FIG. 14) of the first correction data calculation unit 54 acquires the luminosity index data D9 related to each processing block from the color ratio data D7 (S54). The first correction data arithmetic processing unit 60 acquires the flash correction data (flash influence map for each color) D4 related to each processing block from the luminosity index data D9 (S55).

Then, the first luminosity data acquisition unit 62 (see FIG. 16) of the flash luminosity correction unit 44 acquires the first luminosity data D10 related to each processing block from the flash image component data D3 acquired by the flash image component acquisition unit 40 (S56). Then, the first correction calculation unit 63 of the flash luminosity correction unit 44 acquires the flash image correction component data D5 from the first luminosity data D10 and the flash correction data D4 (S57).

Figure 29:
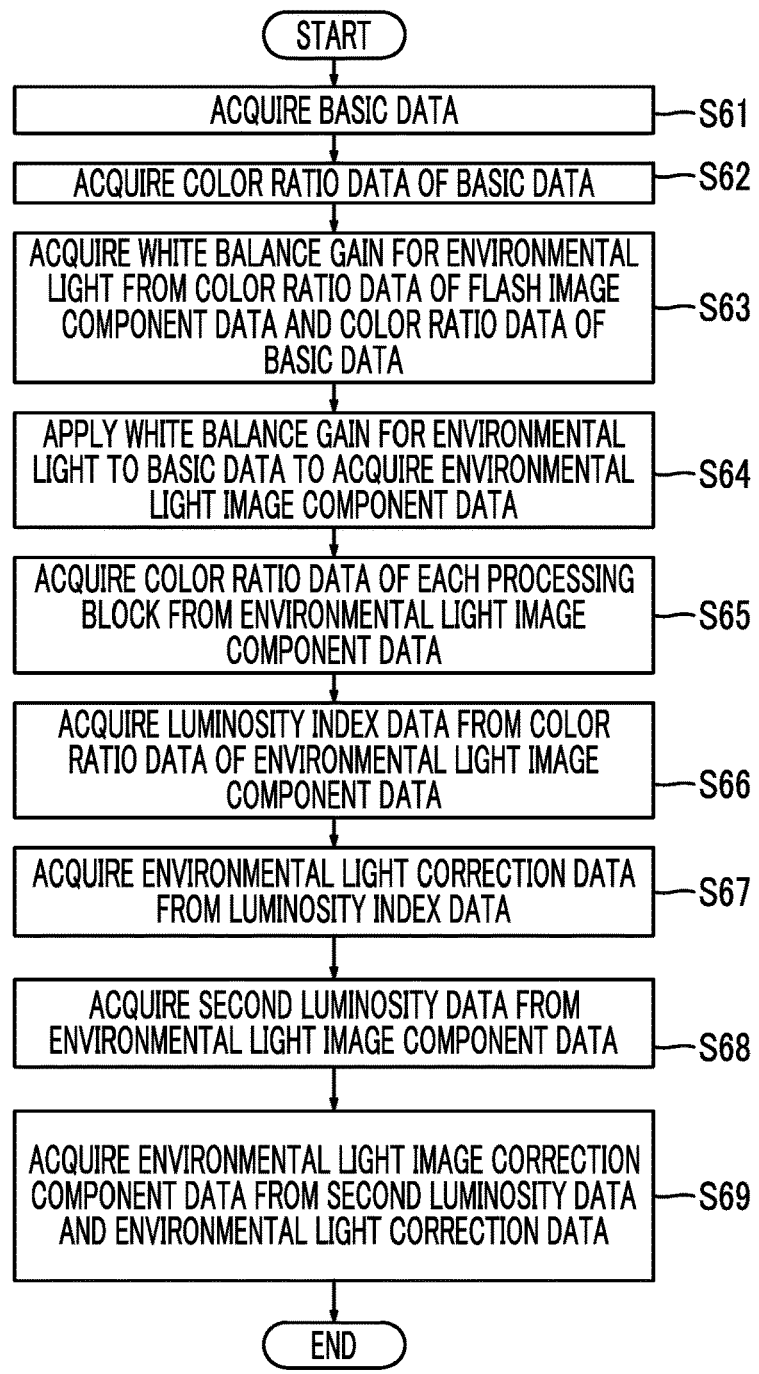
FIG. 29 is a flowchart illustrating in detail the flow of a process (Step S43 in FIG. 27) for acquiring environmental light image correction component data in the fourth embodiment.

FIG. 29 is a flowchart illustrating in detail the flow of a process (Step S43 in FIG. 27) for acquiring the environmental light image correction component data D13 in the fourth embodiment.

First, the second image data extraction unit 72 (see FIG. 19) of the environmental light image component acquisition unit 66 acquires the basic data D14 on the basis of the flash non-emission image data D2 (S61 in FIG. 29).

Then, the basic data color ratio acquisition unit 76 (see FIG. 21) acquires the color ratio data D15 from the basic data D14 (S62). The white balance gain acquisition unit 77 (see FIG. 21) acquires the white balance gain WB2 for environmental light from the color ratio data D7 of the flash image component data D3 and the color ratio data D15 of the basic data D14 (S63).

Then, the second white balance adjustment unit 78 (see FIG. 21) applies the white balance gain WB2 for environmental light to the basic data D14 to acquire the environmental light image component data D11 (S64). Then, the second color ratio data acquisition unit 80 (see FIG. 22) of the environmental light correction data acquisition unit 68 acquires the color ratio data D16 of the environmental light image component data D11 for each processing block (S65). The second luminosity index data acquisition unit 84 (see FIG. 24) of the second correction data calculation unit 81 acquires the luminosity index data D18 for each processing block from the color ratio data D16 of the environmental light image component data D11 (S66). Then, the second correction data arithmetic processing unit 85 (see FIG. 24) acquires the environmental light correction data D12 from the luminosity index data D18 (S67).

Then, the second luminosity data acquisition unit 86 (see FIG. 25) of the environmental light luminosity correction unit 70 acquires the second luminosity data D19 from the environmental light image component data D11 (S68). The second correction calculation unit 87 (see FIG. 25) acquires the environmental light image correction component data D13 from the second luminosity data D19 and the environmental light correction data D12 (S69).

As described above, according to the image processing device 31 and the image processing method of this embodiment, it is possible to accurately calculate the influence of flash light and the influence of environmental light and to accurately perform white balance processing for the flash emission image data D1 on the basis of the accurate influence of flash light and accurate influence of environmental light.

In a case in which imaging is performed while flash light is emitted, a sufficient amount of flash light may not reach a portion of or the entire object. In white balance processing which is performed considering only the influence of flash light, it may be difficult to adjust the color of an image to the original color of the object. However, according to the image processing device 31 and the image processing method of this embodiment, since white balance processing is performed considering both the influence of flash light and the influence of environmental light, it is possible to appropriately recover the original color of the object.

For example, even if an "image portion which a sufficient amount of flash light reaches and in which the amount of flash light is dominant" and an "image portion which a sufficient amount of flash light does not reach and in which the influence of flash light is not dominant" are mixed in the flash emission image data D1, it is possible to perform appropriate white balance processing for each of the image portions in a state in which a difference in luminosity caused by the color of the object has been compensated for.

Other Modification Examples

Among the above-described embodiments and modification examples, any embodiments and modification examples may be combined with each other. The above-described embodiments are illustrative and the invention may be applied to other structures.

In each of the first to fourth embodiments, the process of acquiring the flash image correction component data D5 and image processing using the flash image correction component data D5 are performed in the camera body 3. However, some or all of the processes may be performed by a device such as a computer or a server other than the camera body 3 (digital camera 2). For example, when a computer processes image data, data, such as the flash emission image D1 and the flash non-emission image D2, may be input to an image processing device provided in the computer and the process of acquiring the flash image correction component data D5 and image processing using the flash image correction component data D5 may be performed. In a case in which a server comprises an image processing device, for example, data, such as the flash emission image D1 and the flash non-emission image D2, may be transmitted from the digital camera 2 (camera body 3) or the computer to the server and the image processing device of the server may perform the process of acquiring the flash image correction component data D5 and image processing using the flash image correction component data D5 for the image data and may transmit and provide the image data subjected to the image processing to a transmission source.

Each of the above-mentioned functional structures can be implemented by any hardware, software, or a combination thereof. For example, the invention can also be applied to a program that causes a computer to perform an image processing method (processing step (process procedure)) in each of the above-mentioned devices and processing units (for example, the image processing device 31), a computer-readable storage medium (non-transitory storage medium) that stores the program, or a computer in which the program can be installed.

The aspects to which the invention can be applied are not limited to the digital camera and the computer (server). The invention can also be applied to cameras having an imaging function as a main function and mobile devices having functions (a calling function, a communication function, and other computer functions) other than the imaging function, in addition to the imaging function. Other aspects to which the invention can be applied are, for example, mobile phones, smart phones, personal digital assistants (PDAs), and portable game machines with a camera function. Hereinafter, an example of the smart phone to which the invention can be applied will be described.

<Structure of Smart Phone>

Figure 30:
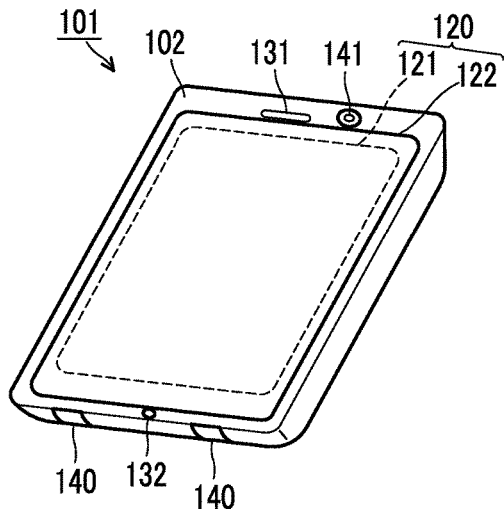
FIG. 30 is a diagram illustrating the outward appearance of a smart phone.

FIG. 30 is a diagram illustrating the outward appearance of a smart phone 101. The smart phone 101 illustrated in FIG. 30 comprises a housing 102 with a flat panel shape and a display input unit 120 having a display panel 121 as a display unit and an operation panel 122 as an input unit which are integrally formed on one surface of the housing 102. The housing 102 comprises a speaker 131, a microphone 132, an operating unit 140, and a camera unit 141. However, the configuration of the housing 102 is not limited thereto. For example, the display unit and the input unit may be independently provided, or the housing 102 may have a folding structure or a sliding structure.

Figure 31:
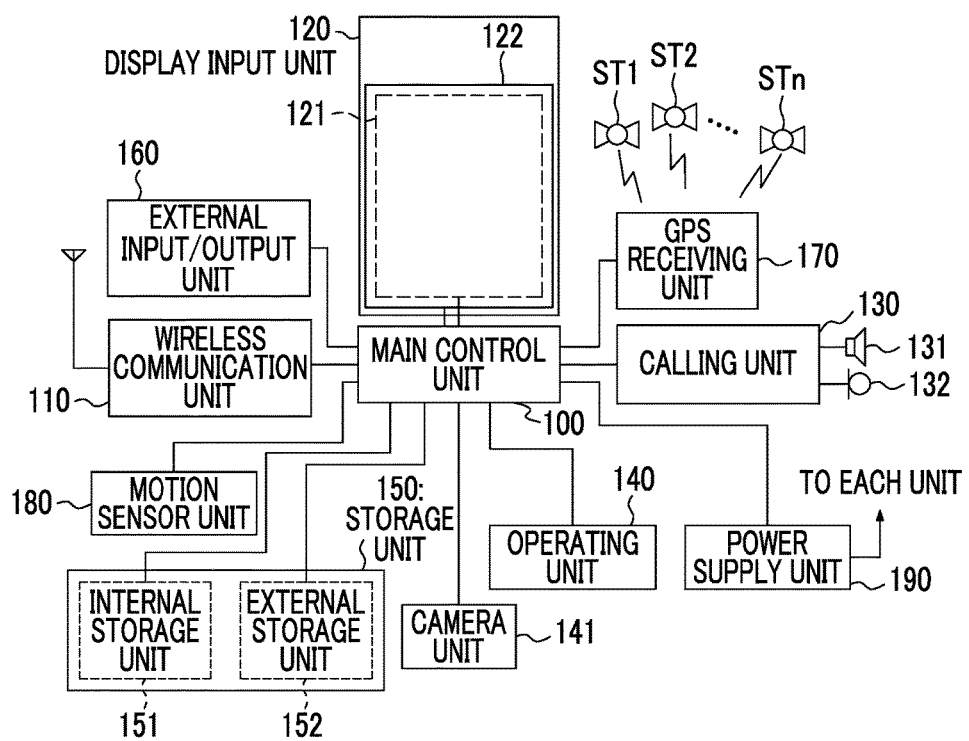
FIG. 31 is a block diagram illustrating the structure of the smart phone illustrated in FIG. 30.
Figure 32:
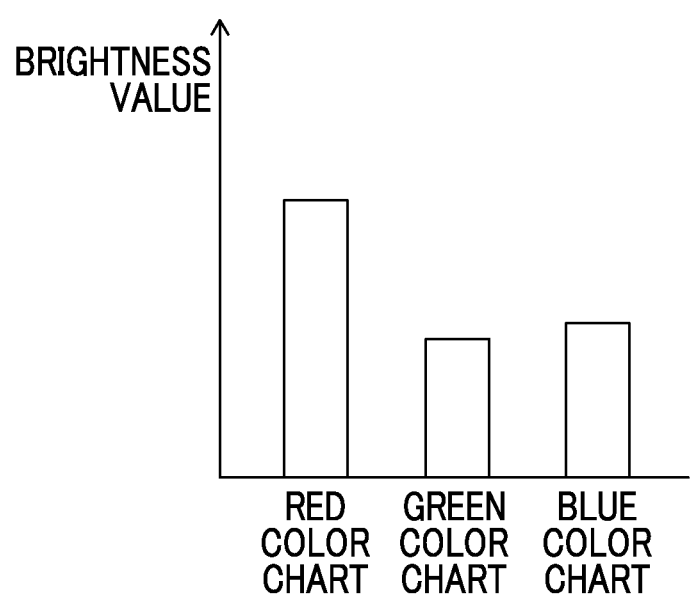
FIG. 32 is a graph illustrating the relationship between the brightnesses of "difference data between a flash emission image and a flash non-emission image" related to a red color chart, a green color chart, and a blue color chart.

FIG. 31 is a block diagram illustrating the structure of the smart phone 101 illustrated in FIG. 30. As illustrated in FIG. 31, the smart phone 101 comprises, as main components, a wireless communication unit 110, the display input unit 120, a calling unit 130, the operating unit 140, the camera unit 141, a storage unit 150, an external input/output unit 160, a global positioning system (GPS) receiving unit 170, a motion sensor unit 180, a power supply unit 190, and a main control unit 100. The smart phone 101 has, as a main function, a wireless communication function which performs mobile wireless communication through a base station apparatus BS and a mobile communication network NW.

The wireless communication unit 110 performs wireless communication with the base station apparatus BS which is accommodated in the mobile communication network NW in response to an instruction from the main control unit 100. The wireless communication is used to transmit and receive various types of file data, such as voice data and image data, and electronic mail data or to receive, for example, web data and streaming data.

The display input unit 120 is a so-called touch panel that displays, for example, images (still images and moving images) or text information to visually transmit information to a user and detects the user's operation for the displayed information under the control of the main control unit 100 and comprises the display panel 121 and the operation panel 122.

The display panel 121 uses, for example, a liquid crystal display (LCD) or an organic electro-luminescence display (OELD) as a display device. The operation panel 122 is a device that is provided such that an image displayed on a display surface of the display panel 121 is visually recognized and detects coordinates operated by a finger of the user or a stylus. When the device is operated by a finger of the user or a stylus, a detection signal which is generated by the operation is output to the main control unit 100. Then, the main control unit 100 detects an operation position (coordinates) on the display panel 121 on the basis of the received detection signal.

As illustrated in FIG. 30, the display panel 121 and the operation panel 122 of the smart phone 101 which is an embodiment of the imaging device according to the invention are integrated to form the display input unit 120 and the operation panel 122 is arranged so as to completely cover the display panel 121. In a case in which this arrangement is used, the operation panel 122 may have a function of detecting the user's operation even in a region other than the display panel 121. In other words, the operation panel 122 may comprise a detection region (hereinafter, referred to as a display region) for an overlap portion which overlaps the display panel 121 and a detection region (hereinafter, referred to as a non-display region) for an outer edge portion which does not overlap the display panel 121.

The size of the display region may be exactly equal to the size of the display panel 121. However, the sizes are not necessarily equal to each other. The operation panel 122 may comprise two sensitive regions, that is, an outer edge portion and an inner portion other than the outer edge portion. The width of the outer edge portion is appropriately designed according to, for example, the size of the housing 102. Examples of a position detecting method which is used in the operation panel 122 include a matrix switching method, a resistive film method, a surface elastic wave method, an infrared method, an electromagnetic induction method, and a capacitive sensing method. Any of the methods may be used.

The calling unit 130 comprises the speaker 131 and the microphone 132. The calling unit 130 converts the voice of the user which is input through the microphone 132 into voice data which can be processed by the main control unit 100 and outputs the converted voice data to the main control unit 100. In addition, the calling unit 130 decodes voice data received by the wireless communication unit 110 or the external input/output unit 160 and outputs the decoded voice data from the speaker 131. As illustrated in FIG. 30, for example, the speaker 131 can be mounted on the same surface as the display input unit 120 and the microphone 132 can be mounted on a side surface of the housing 102.

The operating unit 140 is a hardware key which uses, for example, a key switch and receives instructions from the user. For example, as illustrated in FIG. 30, the operating unit 140 is a push button switch which is mounted on the side surface of the housing 102 of the smart phone 101, is turned on when it is pressed by, for example, a finger, and is turned off by the restoring force of a spring when the finger is taken off.

The storage unit 150 stores a control program or control data of the main control unit 100, application software, address data which is associated with, for example, the names or phone numbers of communication partners, transmitted and received electronic mail data, web data which is downloaded by web browsing, and downloaded content data. In addition, the storage unit 150 temporarily stores, for example, streaming data. The storage unit 150 includes an internal storage unit 151 which is provided in the smart phone and an external storage unit 152 which has an attachable and detachable external memory slot. The internal storage unit 151 and the external storage unit 152 forming the storage unit 150 are implemented by a storage medium, such as a flash memory, a hard disk, a multimedia-card-micro-type memory, a card-type memory (for example, a MicroSD (registered trademark) memory), a random access memory (RAM), or a read only memory (ROM).

The external input/output unit 160 functions as an interface with all of the external apparatuses connected to the smart phone 101 and is directly or indirectly connected to other external apparatuses by communication (for example, universal serial bus (USB) communication or IEEE1394 communication) or a network (for example, the Internet, a wireless LAN, a Bluetooth (registered trademark) network, a radio frequency identification (RFID) network, an infrared data association (IrDA) (registered trademark) network, an ultra wideband (UWB) (registered trademark) network, or a ZigBee (registered trademark) network).

Examples of the external apparatus connected to the smart phone 101 include a wired/wireless headset, a wired/wireless external charger, a wired/wireless data port, a memory card or a subscriber identity module (SIM) user identity module (UIM) card which is connected through a card socket, an external audio/video apparatus which is connected through audio/video input/output (I/O) terminals, a wirelessly connected external audio/video apparatus, a smart phone which is connected wirelessly or in a wired manner, a personal computer which is connected wirelessly or in a wired manner, a PDA which is connected wirelessly or in a wired manner, and an earphone which is connected wirelessly or in a wired manner. The external input/output unit may transmit data which is received from the external apparatus to each component of the smart phone 101 or may transmit data in the smart phone 101 to the external apparatus.

The GPS receiving unit 170 receives GPS signals transmitted from GPS satellites ST1 to STn and performs a position measurement process on the basis of the received GPS signals to detect a position including the latitude, longitude, and height of the smart phone 101, in response to an instruction from the main control unit 100. In a case in which the GPS receiving unit 170 can acquire positional information from the wireless communication unit 110 or the external input/output unit 160 (for example, the wireless LAN), the GPS receiving unit 170 can detect the position using the positional information.

The motion sensor unit 180 comprises, for example, a triaxial acceleration sensor and detects the physical movement of the smart phone 101 in response to an instruction from the main control unit 100. When the physical movement of the smart phone 101 is detected, the moving direction or acceleration of the smart phone 101 is detected. The detection result is output to the main control unit 100.

The power supply unit 190 supplies power which is stored in a battery (not illustrated) to each unit of the smart phone 101 in response to an instruction from the main control unit 100.

The main control unit 100 comprises a microprocessor, operates on the basis of the control program or control data stored in the storage unit 150, and controls the overall operation of each unit of the smart phone 101. The main control unit 100 has an application processing function and a mobile communication control function of controlling each unit of a communication system in order to perform voice communication or data communication through the wireless communication unit 110.

The application processing function is implemented by the operation of the main control unit 100 based on the application software which is stored in the storage unit 150. Examples of the application processing function include an infrared communication function which controls the external input/output unit 160 such that data communication with an opposing apparatus is performed, an electronic mail function which transmits and receives electronic mail, and a web browsing function which browses web pages.

The main control unit 100 has, for example, an image processing function which displays an image on the display input unit 120 on the basis of image data (still image or moving image data) such as received data or downloaded streaming data. The image processing function means the function of the main control unit 100 decoding the image data, performing image processing on the decoding result, and displaying the image on the display input unit 120.

The main control unit 100 performs display control for the display panel 121 and operation detection control for detecting the operation of the user through the operating unit 140 and the operation panel 122.

The main control unit 100 performs the display control to display a software key, such as an icon for starting application software or a scroll bar, or to display a window for writing electronic mail. The scroll bar means a software key for receiving an instruction to move a displayed portion of an image that is too large to fit into the display region of the display panel 121.

The main control unit 100 performs the operation detection control to detect the operation of the user input through the operating unit 140, to receive an operation for the icon or the input of a character string to an input field of the window through the operation panel 122, or to receive a request to scroll the displayed image through the scroll bar.

In addition, the main control unit 100 has a touch panel control function that performs the operation detection control to determine whether the position of an operation for the operation panel 122 is an overlap portion (display region) which overlaps the display panel 121 or an outer edge portion (non-display region) which does not overlap the display panel 121 other than the overlap portion and controls a sensitive region of the operation panel 122 or the display position of the software key.

The main control unit 100 can detect a gesture operation for the operation panel 122 and can perform a predetermined function according to the detected gesture operation. The gesture operation does not mean a simple touch operation according to the related art, but means an operation which draws a trace using a finger, an operation which designates a plurality of positions at the same time, or a combination thereof which draws a trace for at least one of the plurality of positions.

The camera unit 141 is a digital camera which electronically captures an image using an imaging element such as a CMOS. In addition, the camera unit 141 can convert captured image data into image data which is compressed in, for example, a JPEG format, store the converted image data in the storage unit 150, and output the converted image data through the external input/output unit 160 or the wireless communication unit 110, under the control of the main control unit 100. As illustrated in FIG. 30, the camera unit 141 is mounted on the same surface as the display input unit 120 in the smart phone 101. However, the mounting position of the camera unit 141 is not limited thereto. For example, the camera unit 141 may be mounted on the rear surface of the display input unit 120 or a plurality of camera units 141 may be mounted. In a case in which a plurality of camera units 141 are mounted, the camera units 141 which are used to capture images may be switched such that a single camera unit captures images or the plurality of camera units 141 may be simultaneously used to capture images.

The camera unit 141 can be used for various functions of the smart phone 101. For example, the image captured by the camera unit 141 can be displayed on the display panel 121 or the image captured by the camera unit 141 can be used as one of the operation inputs of the operation panel 122. When the GPS receiving unit 170 detects the position, the position may be detected with reference to the image from the camera unit 141. In addition, the optical axis direction of the camera unit 141 in the smart phone 101 may be determined or the current usage environment may be determined, with reference to the image from the camera unit 141, using the triaxial acceleration sensor or without using the triaxial acceleration sensor. Of course, the image from the camera unit 141 may be used in the application software.

For example, the positional information which is acquired by the GPS receiving unit 170, the voice information which is acquired by the microphone 132 (for example, the main control unit may convert the voice information into text information), and the posture information which is acquired by the motion sensor unit 180 may be added to the image data of a still image or a moving image and the image data may be stored in the storage unit 150 and may be output through the external input/output unit 160 or the wireless communication unit 110.

The image processing device 31 may be implemented by, for example, the main control unit 100.

EXPLANATION OF REFERENCES

- 2: digital camera
- 3: camera body
- 4: lens barrel
- 5: flash light emitting unit
- 6: shutter button
- 7: power switch
- 8: display unit
- 9: operating unit
- 10: main memory
- 12: lens unit
- 14: pixel
- 16: color filter
- 20: mechanical shutter
- 21: imaging element
- 22: process processing unit
- 23: A/D conversion unit
- 24: buffer memory
- 25: system control unit
- 26: shutter driving unit
- 27: lens driving unit
- 28: power supply control unit
- 29: power supply
- 30: control memory
- 31: image processing device
- 32: compression and decompression unit
- 33: storage control unit
- 34: clock device
- 35: display control unit
- 36: user interface
- 40: flash image component acquisition unit
- 42: flash correction data acquisition unit
- 44: flash luminosity correction unit
- 46: white balance processing unit
- 47: first image data extraction unit
- 48: subtracter
- 49: first extraction data adjustment unit
- 50: first white balance adjustment unit
- 51: flash light WB gain storage unit
- 53: first color ratio data acquisition unit
- 54: first correction data calculation unit
- 56: first demosaicing processing unit
- 57: first color ratio calculation unit
- 59: first luminosity index data acquisition unit
- 60: first correction data arithmetic processing unit
- 62: first luminosity data acquisition unit
- 63: first correction calculation unit
- 66: environmental light image component acquisition unit
- 68: environmental light correction data acquisition unit
- 70: environmental light luminosity correction unit
- 72: second image data extraction unit
- 73: second extraction data adjustment unit
- 74: first subtracter
- 75: second subtracter
- 76: basic data color ratio acquisition unit
- 77: white balance gain acquisition unit
- 78: second white balance adjustment unit
- 80: second color ratio data acquisition unit
- 81: second correction data calculation unit
- 82: second demosaicing processing unit
- 83: second color ratio calculation unit
- 84: second luminosity index data acquisition unit
- 85: second correction data arithmetic processing unit
- 86: second luminosity data acquisition unit
- 87: second correction calculation unit
- 88: light source ratio data acquisition unit
- 89: white balance arithmetic processing unit
- 100: main control unit
- 101: smart phone
- 102: housing
- 110: wireless communication unit
- 120: display input unit
- 121: display panel
- 122: operation panel
- 130: calling unit
- 131: speaker
- 132: microphone
- 140: operating unit
- 141: camera unit
- 150: storage unit
- 151: internal storage unit
- 152: external storage unit
- 160: external input/output unit
- 170: GPS receiving unit
- 180: motion sensor unit
- 190: power supply unit

What is claimed is:

1. An image processing device comprising:
a processor configured to:
acquire flash image component data indicating a flash light image component of an object on the basis of first image data which is acquired by capturing an image of the object while flash light is emitted;
acquire flash correction data, in which a difference in luminosity of the flash image component data caused by a color of the object has been reflected, on the basis of the flash image component data; and
acquire flash image correction component data, in which the difference in the luminosity of the flash image component data caused by the color of the object has been compensated for, on the basis of the flash image component data and the flash correction data,
wherein the processor acquires color ratio data indicating a color component ratio of the flash image component data, which is divided into a plurality of processing blocks, in each of the plurality of processing blocks of the flash image component data, and
the processor acquires the flash correction data, in which a difference in luminosity between the plurality of processing blocks of the flash image component data caused by the color of the object has been reflected, on the basis of the color ratio data of the flash image component data.

2. The image processing device according to claim 1, wherein the processor acquires the flash image component data from first difference data indicating a difference between the first image data and second image data which is acquired by capturing an image of the object without emitting the flash light.

3. The image processing device according to claim 1, wherein the processor acquires the flash image component data from first difference data indicating a difference between the first image data which is acquired by capturing an image of the object while a first amount of flash light is emitted and second image data which is acquired by capturing an image of the object while a second amount of flash light different from the first amount of flash light is emitted.

4. The image processing device according to claim 2, wherein the processor applies a white balance gain for flash light to the first difference data to acquire the flash image component data.

5. The image processing device according to claim 1, wherein the flash correction data is applied to first luminosity data indicating the luminosity of the flash image component data to compensate for the difference in the luminosity of the flash image component data caused by the color of the object, and
the processor acquires the flash correction data for each of the plurality of processing blocks of the flash image component data.

6. The image processing device according to claim 1, wherein the processor acquires the flash correction data related to each of the plurality of processing blocks on the basis of the color ratio data of achromatic colors.

7. The image processing device according to claim 1, wherein the first image data is acquired by an imaging element including color filters of a plurality of colors,
the flash image component data includes color component data related to each of the plurality of colors, and
the processor acquires the color ratio data of the flash image component data in each of the plurality of processing blocks on the basis of the color component data.

8. The image processing device according to claim 7, wherein the color ratio data of the flash image component data is based on a ratio of the color component data of the flash image component data related to each of the plurality of colors to a sum of the color component data of the plurality of colors of the flash image component data in each of the plurality of processing blocks.

9. The image processing device according to claim 8, wherein, on the basis of arithmetic processing which derives luminosity index data indicating the luminosity of the flash image component data corresponding to the color of the object from the color ratio data of the flash image component data, the processor acquires the luminosity index data of the flash image component data in each of the plurality of processing blocks from the color ratio data of the flash image component data in each of the plurality of processing blocks,
the processor acquires, from the color ratio data of achromatic colors having the same ratio of the color component data related to each of the plurality of colors to the sum of the color component data of the plurality of colors in each of the plurality of processing blocks, the luminosity index data related to the achromatic colors on the basis of the arithmetic processing, and
the processor acquires the flash correction data related to each of the plurality of processing blocks of the flash image component data on the basis of a ratio of the luminosity index data of the flash image component data in each of the plurality of processing blocks to the luminosity index data related to the achromatic colors.

10. The image processing device according to claim 1, wherein each of the plurality of processing blocks includes a single pixel.

11. The image processing device according to claim 1, wherein each of the plurality of processing blocks includes a plurality of pixels.

12. The image processing device according to claim 11, wherein the imaging element used to capture the first image data is a single-plate imaging element including color filters of a plurality of colors,
the color filters of the plurality of colors are formed by repeatedly arranging a basic array with a specific color pattern, and
the plurality of pixels forming each of the plurality of processing blocks correspond to pixels forming the basic array.

13. The image processing device according to claim 1, wherein the processor is further configured to:
acquire environmental light image component data indicating an environmental light image component of the object;
acquire environmental light correction data, in which a difference in luminosity of the environmental light image component data caused by the color of the object has been reflected, on the basis of the environmental light image component data; and
acquire environmental light image correction component data, in which the difference in the luminosity of the environmental light image component data caused by the color of the object has been compensated for, on the basis of the environmental light image component data and the environmental light correction data.

14. The image processing device according to claim 13, wherein the processor acquires the environmental light image component data, using second image data which is acquired by capturing an image of the object without emitting flash light as basic data.

15. The image processing device according to claim 13, wherein the processor acquires the environmental light image component data, using second difference data, which indicates a difference between the first image data and the first difference data indicating the difference between the first image data and the second image data acquired by capturing the image of the object without emitting the flash light, as basic data.

16. The image processing device according to claim 14, wherein the processor acquires color ratio data indicating a color component ratio of the basic data in each of the plurality of processing blocks,
the processor acquires a white balance gain for environmental light on the basis of the color ratio data of the flash image component data and the color ratio data of the basic data in each of the plurality of processing blocks, and
the processor applies the white balance gain for environmental light to the basic data to acquire the environmental light image component data.

17. The image processing device according to claim 16, wherein the white balance gain for environmental light is applied to the color ratio data of the basic data in each of the plurality of processing blocks to derive the color ratio data of the environmental light image component data in each of the plurality of processing blocks.

18. The image processing device according to claim 13, wherein the processor acquires color ratio data indicating a color component ratio of the environmental light image component data in each of the plurality of processing blocks, and
the processor acquires the environmental light correction data, in which a difference in luminosity between the plurality of processing blocks of the environmental light image component data caused by the color of the object has been reflected, on the basis of the color ratio data of the environmental light image component data.

19. The image processing device according to claim 18, wherein the environmental light correction data is applied to second luminosity data indicating the luminosity of the environmental light image component data to compensate for the difference in the luminosity of the environmental light image component data caused by the color of the object, and
the processor acquires the environmental light correction data for each of the plurality of processing blocks of the environmental light image component data.

20. The image processing device according to claim 18, wherein the processor acquires the environmental light correction data related to each of the plurality of processing blocks on the basis of the color ratio data of achromatic colors.

21. The image processing device according to claim 18, wherein the first image data is captured by an imaging element including color filters of a plurality of colors, the environmental light image component data includes color component data related to each of the plurality of colors, and
the processor acquires the color ratio data of the environmental light image component data in each of the plurality of processing blocks on the basis of the color component data.

22. The image processing device according to claim 21, wherein the color ratio data of the environmental light image component data is based on a ratio of the color component data of the environmental light image component data related to each of the plurality of colors to a sum of the color component data of the plurality of colors of the environmental light image component data in each of the plurality of processing blocks.

23. The image processing device according to claim 22, wherein, on the basis of arithmetic processing which derives luminosity index data indicating the luminosity of the environmental light image component data corresponding to the color of the object from the color ratio data of the environmental light image component data, the processor acquires the luminosity index data of the environmental light image component data in each of the plurality of processing blocks from the color ratio data of the environmental light image component data in each of the plurality of processing blocks, the processor acquires, from the color ratio data of achromatic colors having the same ratio of the color component data related to each of the plurality of colors to the sum of the color component data of the plurality of colors in each of the plurality of processing blocks, the luminosity index data related to the achromatic colors on the basis of the arithmetic processing, and
the processor acquires the environmental light correction data related to each of the plurality of processing blocks of the environmental light image component data on the basis of a ratio of the luminosity index data of the environmental light image component data in each of the plurality of processing blocks to the luminosity index data related to the achromatic colors.

24. The image processing device according to claim 1, wherein the processor is further configured to:
adjust a white balance of the first image data on the basis of the flash image correction component data.

25. The image processing device according to claim 13, wherein the processor is further configured to:
adjust a white balance of the first image data on the basis of the flash image correction component data and the environmental light image correction component data.

26. The image processing device according to claim 1, wherein the luminosity is brightness.

27. An imaging device comprising:
an imaging element; and
the image processing device according to claim 1.

28. An image processing method comprising:
a step of acquiring flash image component data indicating a flash light image component of an object from first image data which is acquired by capturing an image of the object while flash light is emitted;
a step of acquiring flash correction data, in which a difference in luminosity of the flash image component data caused by a color of the object has been reflected, on the basis of the flash image component data; and
a step of acquiring flash image correction component data, in which the difference in the luminosity of the flash image component data caused by the color of the object has been compensated for, on the basis of the flash image component data and the flash correction data,
wherein in the step of acquiring flash correction data, color ratio data indicating a color component ratio of the flash image component data in acquired, which is divided into a plurality of processing blocks, in each of the plurality of processing blocks of the flash image component data, and
in the step of acquiring flash correction component data, the flash correction data, in which a difference in luminosity between the plurality of processing blocks of the flash image component data caused by the color of the object has been reflected, is acquired on the basis of the color ratio data of the flash image component data.

29. A non-transitory computer-readable tangible recording medium that stores a program that causes a computer to perform the image processing method according to claim 28.

* * * * *